US010179282B2

(12) United States Patent
LaChappelle et al.

(10) Patent No.: US 10,179,282 B2
(45) Date of Patent: Jan. 15, 2019

(54) JOYSTICK INPUT APPARATUS WITH LIVING HINGES

(71) Applicant: Impyrium, Inc., Durango, CO (US)

(72) Inventors: Easton J. LaChappelle, Durango, CO (US); Tim Schneider, Durango, CO (US)

(73) Assignee: Impyrium, Inc., Durango, CO (US)

( * ) Notice: Subject to any disclaimer, the term of this patent is extended or adjusted under 35 U.S.C. 154(b) by 154 days.

(21) Appl. No.: 15/441,606

(22) Filed: Feb. 24, 2017

(65) Prior Publication Data
US 2017/0246533 A1 Aug. 31, 2017

Related U.S. Application Data

(60) Provisional application No. 62/300,138, filed on Feb. 26, 2016.

(51) Int. Cl.
A63F 9/24 (2006.01)
A63F 13/24 (2014.01)
G05G 9/047 (2006.01)

(52) U.S. Cl.
CPC .............. A63F 13/24 (2014.09); G05G 9/047 (2013.01)

(58) Field of Classification Search
CPC ............ G05G 9/047; G05G 5/05; A63F 13/24
USPC .......................................................... 463/38
See application file for complete search history.

(56) References Cited

U.S. PATENT DOCUMENTS

| 404,284 | A | 5/1889 | Johnson |
| RE13,699 | E | 3/1914 | Denis |
| 1,176,632 | A | 3/1916 | Werner |
| 2,088,703 | A | 8/1937 | Hubbard et al. |
| 2,348,225 | A | 5/1944 | Petty |
| 2,407,757 | A | 9/1946 | MacCallum |
| 2,690,529 | A | 9/1954 | Lindblad |
| 2,767,973 | A | 10/1956 | Ter Veen et al. |
| 2,778,626 | A | 1/1957 | Klepp |
| 2,836,912 | A | 6/1958 | Ranucci |
| 2,904,067 | A | 9/1959 | Johansson |
| 3,120,950 | A | 2/1964 | Hardison |
| 3,344,397 | A | 9/1967 | Elliott et al. |
| 3,495,687 | A | 2/1970 | Shirley, Jr. et al. |
| 3,504,904 | A | 4/1970 | Irwin et al. |
| 3,598,389 | A | 8/1971 | Kohler |
| 4,285,054 | A | 8/1981 | McNeel |

(Continued)

Primary Examiner — David L Lewis
Assistant Examiner — Robert Mosser
(74) Attorney, Agent, or Firm — Lerner, David, Littenberg, Krumholz & Mentlik, LLP

(57) ABSTRACT

A joystick apparatus includes a handgrip connected to a hinge mechanism by a rigid bar. The hinge mechanism includes two living hinges that surround the bar and provide a restoring spring force in six degrees of motion. A third living hinge surrounds the bar and includes a disc member positioned between the center of the third living hinge and the bar. The third living hinge provides a restoring force in five degrees of motion, while rotation of the bar along its longitudinal axis causes the disc member to rotate relative the third living hinge. The rotation of the disc member relative to the third living hinge may be tracked with a Hall effect sensor. Other sensors may be provided on the hinge mechanism to track the motion of the bar and to cause a connected device to move in a fashion corresponding to movement of the joystick.

20 Claims, 19 Drawing Sheets

(56) References Cited

U.S. PATENT DOCUMENTS

| | | | |
|---|---|---|---|
| 4,323,994 | A | 4/1982 | Coogler |
| 4,623,991 | A | 11/1986 | Vitringa |
| 4,754,155 | A | 6/1988 | Obermeyer |
| 4,755,690 | A | 7/1988 | Obermeyer |
| 4,772,157 | A | 9/1988 | Obermeyer |
| 4,780,024 | A | 10/1988 | Obermeyer et al. |
| 4,804,855 | A | 2/1989 | Obermeyer |
| 5,092,707 | A | 3/1992 | Obermeyer |
| 5,349,881 | A * | 9/1994 | Olorenshaw ............ G05G 5/05 200/6 A |
| 5,538,360 | A | 7/1996 | Obermeyer |
| 5,577,414 | A | 11/1996 | Ogawa et al. |
| 5,642,963 | A | 7/1997 | Obermeyer |
| 5,709,502 | A | 1/1998 | Obermeyer |
| 5,713,699 | A | 2/1998 | Obermeyer et al. |
| 5,901,613 | A | 5/1999 | Forslund |
| 5,948,501 | A | 9/1999 | Obermeyer |
| 6,121,743 | A | 9/2000 | Genov et al. |
| 6,196,763 | B1 | 3/2001 | Obermeyer |
| 6,244,644 | B1 | 6/2001 | Lovchik et al. |
| 6,281,597 | B1 | 8/2001 | Obermeyer et al. |
| 6,286,225 | B1 | 9/2001 | Schimmels et al. |
| 6,422,547 | B1 | 7/2002 | Gibbens |
| 6,478,486 | B1 | 11/2002 | Ando |
| D472,824 | S | 4/2003 | Raab et al. |
| 6,904,691 | B2 | 6/2005 | Raab et al. |
| 6,956,670 | B1 | 10/2005 | Dittrich et al. |
| 7,114,879 | B2 | 10/2006 | Obermeyer |
| 7,188,544 | B2 | 3/2007 | Persson et al. |
| 7,422,392 | B2 | 9/2008 | Obermeyer |
| 7,474,296 | B2 | 1/2009 | Obermeyer et al. |
| 7,594,547 | B2 | 9/2009 | Berry et al. |
| 7,611,103 | B2 | 11/2009 | Ha et al. |
| 7,819,132 | B2 | 10/2010 | Etheridge et al. |
| 7,987,742 | B2 | 8/2011 | Tachibana et al. |
| 8,094,121 | B2 | 1/2012 | Obermeyer et al. |
| 8,176,809 | B2 | 5/2012 | Ihrke et al. |
| 8,470,404 | B2 | 6/2013 | Obermeyer et al. |
| 8,511,937 | B2 | 8/2013 | Obermeyer et al. |
| 8,816,962 | B2 | 8/2014 | Obermeyer et al. |
| 9,019,143 | B2 | 4/2015 | Obermeyer |
| 9,028,170 | B2 | 5/2015 | Obermeyer et al. |
| 9,086,101 | B2 * | 7/2015 | Zhu ........................ F16F 1/027 |
| 9,116,787 | B1 | 8/2015 | Johnson |
| 2003/0143027 | A1 | 7/2003 | Obermeyer et al. |
| 2005/0162389 | A1 | 7/2005 | Obermeyer et al. |
| 2006/0072969 | A1 | 4/2006 | Obermeyer et al. |
| 2006/0078388 | A1 | 4/2006 | Obermeyer |
| 2006/0243080 | A1 * | 11/2006 | Takamoto ................ G05G 5/05 74/471 XY |
| 2007/0042303 | A1 * | 2/2007 | Wakitani ................ G05G 9/047 431/153 |
| 2008/0143116 | A1 | 6/2008 | Obermeyer |
| 2009/0068365 | A1 | 3/2009 | Obermeyer et al. |
| 2009/0091070 | A1 | 4/2009 | Mueller et al. |
| 2009/0102705 | A1 | 4/2009 | Obermeyer |
| 2009/0180835 | A1 | 7/2009 | Obermeyer et al. |
| 2009/0213073 | A1 | 8/2009 | Obermeyer et al. |
| 2010/0145510 | A1 * | 6/2010 | Ihrke .................... B25J 17/0241 700/245 |
| 2010/0234988 | A1 | 9/2010 | Buckingham et al. |
| 2011/0011344 | A1 | 1/2011 | Van Den Berg |
| 2011/0067517 | A1 | 3/2011 | Ihrke et al. |
| 2011/0116871 | A1 | 5/2011 | Obermeyer et al. |
| 2011/0163957 | A1 * | 7/2011 | Jaouen .................... G05G 5/05 345/161 |
| 2012/0162076 | A1 | 6/2012 | Obermeyer et al. |
| 2012/0316686 | A1 | 12/2012 | Dueckman |
| 2013/0156503 | A1 | 6/2013 | Obermeyer |
| 2013/0265233 | A1 | 10/2013 | Obermeyer et al. |
| 2013/0343821 | A1 | 12/2013 | Obermeyer et al. |
| 2014/0138026 | A1 | 5/2014 | Obermeyer et al. |
| 2014/0246859 | A1 | 9/2014 | Obermeyer |
| 2014/0280065 | A1 | 9/2014 | Cronin et al. |
| 2015/0153842 | A1 | 6/2015 | Obermeyer et al. |
| 2015/0337513 | A1 | 11/2015 | Obermeyer et al. |

\* cited by examiner

JOYSTICK INPUT APPARATUS WITH LIVING HINGES

CROSS-REFERENCE TO RELATED APPLICATIONS

The present application claims the benefit of the filing date of U.S. Provisional Patent Application No. 62/300,138 filed Feb. 26, 2016, the disclosure of which is hereby incorporated by reference herein.

BACKGROUND OF THE DISCLOSURE

This disclosure relates to input apparatus systems, and in particular to joystick systems capable of controlling motion of connected devices with up to six degrees of freedom. There are many instances in which it is preferable to remotely control the movement and/or function of a device. For example, reasons of safety, practicality, and ease of use may dictate a preference for controlling the movement and/or function of a device through some form of remote means.

One example of a means to remotely control the movement and/or function of a device is an input apparatus in the form of a joystick. Joysticks are generally capable of movement in at least one and as many as three dimensions, with the movement of the joystick in space corresponding in some fashion to the resulting movement of a device connected to the joystick. However, because the movement of an input apparatus such as a joystick is at least one step removed from the movement and/or functionality of the device caused by the joystick, both precision and ease of use are of great importance in the design of a joystick device. The present disclosure relates at least in part to joystick controller designs that provide increased prevision and ease of use in the control of a device connected to the joystick.

BRIEF SUMMARY

According to one aspect of the disclosure, a joystick input apparatus includes a handgrip portion, a rigid connector portion, and a hinge mechanism. The rigid connector portion has a first end mounted to the handgrip portion opposite a second end. The hinge mechanism includes first, second, and third living hinges. The first living hinge has a first outer rim portion coupled to a first inner disc portion by a first plurality of arced beams having a spiral configuration, the rigid connector portion extending through a center of the first inner disc portion so that movement of the rigid connector portion is fully transmitted to the first living hinge. The second living hinge has a second outer rim portion coupled to a second inner disc portion by a second plurality of arced beams having a spiral configuration, the rigid connector portion extending through a center of the second inner disc portion so that movement of the rigid connector portion is fully transmitted to the second living hinge. The first and second living hinges are spaced apart from one another. The third living hinge has a third outer rim portion coupled to a third inner disc portion by a third plurality of arced beams having a spiral configuration, a rotatable member being rotatably coupled to a center of the third inner disc portion, and the rigid connector portion extending through a center of the rotatable member so that rotation of the rigid connector portion about an axis extending through the center of the third inner disc portion is not transmitted to the third living hinge.

A first inner spacer may be coupled to the rigid connector and space the first inner disc portion of the first living hinge a distance from the second inner disc portion of the second living hinge. A first outer spacer may be coupled to at least one of the first outer rim portion of the first living hinge or the second outer rim portion of the second living hinge and space the first outer rim portion of the first living hinge a distance from the second outer rim portion of the second living hinge. A top outer end cap may define a first terminal end of an outer portion of the hinge mechanism, the top outer end cap having an annular surface defining a cylindrical borehole extending through a center of the top outer end cap. A top inner end cap may define a terminal end of an inner portion of the hinge mechanism, the rigid connector portion extending through and coupled to a center of the top inner end cap. The top inner end cap may include a first cylindrical portion positioned within the cylindrical borehole of the top outer end cap. The top inner end cap may include a second flange portion having a diameter greater than a diameter of the cylindrical borehole of the top outer end cap. A bottom outer end cap may define a second terminal end of the hinge mechanism and may have an annular extension extending toward the top outer end cap, the annular extension defining an inner circular rim within the hinge mechanism. A bottom inner end cap may be coupled to a terminal end of the rigid connector portion and may have a substantially cylindrical outer surface, the bottom inner end cap being positioned at least partially within the inner circular rim of the bottom outer end cap. The first living hinge may be positioned closer to the top outer end cap than the second living hinge, and the third living hinge may be positioned closer to the bottom outer end cap than the second living hinge.

The rotatable member of the third living hinge may include at least one magnet configured to rotate with the rotatable member. The third living hinge may include a Hall effect sensor, the magnet of the rotatable member configured to rotate with respect to the Hall effect sensor.

The rigid connector portion may include a first end positioned within the handgrip portion and a second end opposite the first end and positioned within the hinge mechanism, the first and second ends of the rigid connector portion extending along a longitudinal axis that also extends through a center of the hinge mechanism.

The rigid connector portion may include a first end positioned within the handgrip portion and having a first longitudinal axis extending therethrough, a second end opposite the first end and positioned within the hinge mechanism and having a second longitudinal axis extending therethrough, and a third middle portion connecting the first end to the second end. The first longitudinal axis may be angled with respect to the second longitudinal axis between about 10 degrees and about 30 degrees, including about 20 degrees.

The first living hinge may be rotationally offset with respect to the second living hinge in the absence of applied force. The rotational offset between the first and second living hinges may be about three degrees.

Movement of the hinge mechanism may provide for tracking of up to six degrees of motion, for example including three degrees of motion. Movement of the first and second living hinges may provide for tracking of five degrees of motion. Movement of the third living hinge may provide for tracking of one degree of motion.

DETAILED DESCRIPTION

Figure 1A:
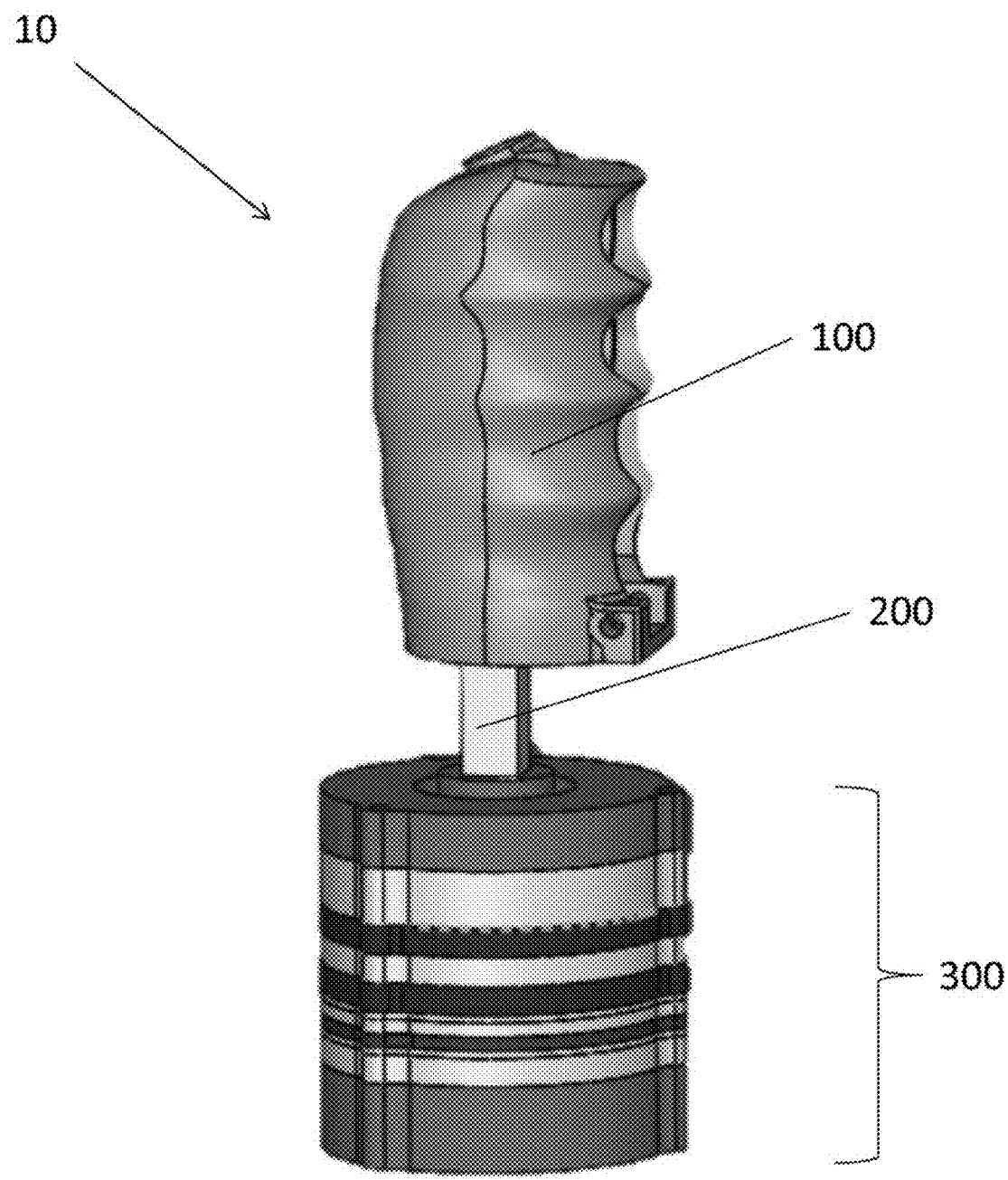
FIGS. 1A-B are perspective views of an input apparatus according to one aspect of the disclosure.
Figure 1B:
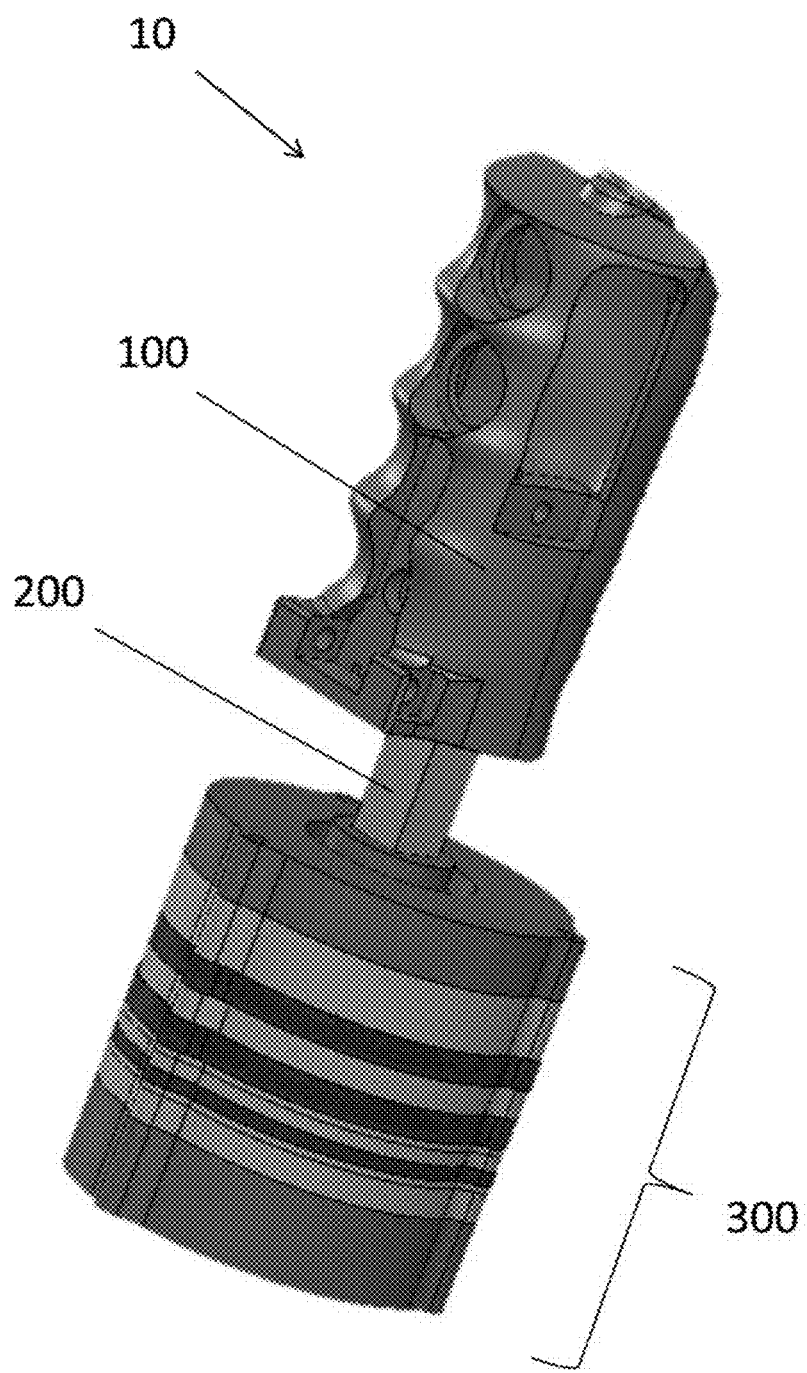

FIGS. 1A-B illustrate an input apparatus 10 according to one aspect of the disclosure. In the particular embodiment illustrated, input apparatus 10 takes the form of a joystick. Joystick 10 may generally include a handgrip portion 100, a connector portion 200, and a sensing and hinge mechanism 300. Generally, a user manipulates the handgrip portion 100, with the movements of the handgrip portion 100 being transmitted to the sensing and hinge mechanism 300 via the connector portion 200, the sensing and hinge mechanism 300 outputting controls to a connected device in order to control movements and/or other functioning of the connected device.

It should be understood that embodiments of joystick 10 described herein may be connected to any appropriate device. For example, any device that has moving parts that may be controlled and/or actuated by functions of joystick 10 may be used with joystick 10. Joystick 10 may be best suited, however, for devices that are capable of movement in up to six degrees of freedom. For example, high powered water blasting equipment which includes one or more water nozzles that may be capable of movement in up to six degrees of freedom may be suited for use with joystick 10, although it should be understood the systems described herein may be used for controlling less than six degrees of freedom of motion. As described in greater detail below, in such a system, the movement of handgrip portion 100 may control movement of the connected device, such as a water nozzle, in six degrees of motion, with buttons, switches, and the like on joystick 10 controlling other features, such as engagement of the connected device, the flow rate of water through the nozzle, etc. However, it should be understood that this is merely one application of joystick 10. Any device that is capable of having motion controlled may be suitable for use with joystick 10.

Figure 2:
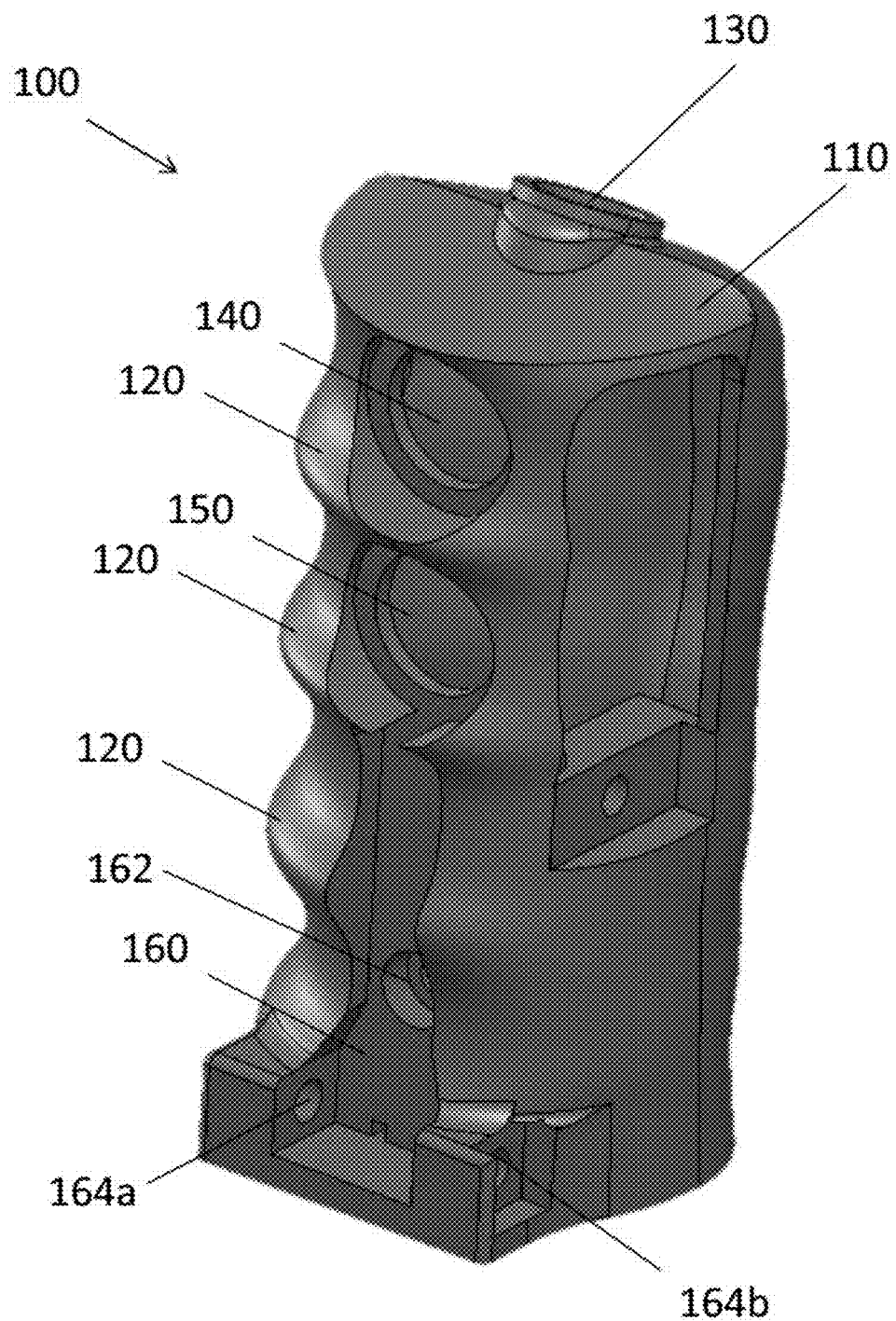
FIG. 2 is a perspective view of a handgrip portion of the input apparatus of FIGS. 1A-B.

FIG. 2 shows a perspective view of handgrip portion 100 isolated from the rest of joystick 10. It should be understood that handgrip portion 100 is illustrated with certain portions omitted to provide clarity, such as certain buttons and levers that are described below. Generally, handgrip portion 100 is sized and shaped to be held by an operator to move in three-dimensional space to control up to six degrees of motion of the device operably connected to joystick 10. Handgrip portion 100 may generally include a casing or handle 110 that may be a single piece or preferably two pieces coupled together for ease of manufacturing. Handle 110 is preferably ergonomically designed so that an operator can comfortable and firmly grasp handle 110 and operate joystick 10 while minimizing the likelihood of slipping or other user discomfort. Handle 110 may include a plurality of ridges 120 to provide a better grip to the user and to help the user locate each finger in the appropriate position for operating joystick 10.

Handle 110 may include a number of apertures, slots, grooves, or other features so that buttons, actuators, sensors, etc. may be provided on handle 110, with the specific functionality of the buttons or similar items being dictated by the needs of the particular connected device being controlled by joystick 10. For example, a first aperture 130 may be positioned at a top end of handle 110 to receive a button intended to be controlled by a user's thumb. This button may take the form of a momentary push button, for example. However, other items including a thumb joystick, multiple push buttons, or variable position sensors may also be particularly suited for the first aperture 130 at the top end of handle 110. A second aperture 140 may be positioned between the top two ridges 120 to receive a button intended to be controlled by a user's index finger, with a third aperture 150 being positioned between the second and third ridges 120 from the top to receive a button intended to be controlled by a user's middle finger. The buttons provided for operation by the index and middle fingers may be linear analog push buttons, for example. The functions of these buttons may take any desired form, such as engaging or disengaging particular systems of the connected device, locking or saving a particular position of the controlled device, or controlling one or more movements of the connected device not accounted for by three dimensional movement of joystick 10. As noted above, it should be understood that the types of buttons (or switches, actuators, etc.) and functions of the buttons provided may be different depending on the particular application desired.

A bottom portion of handle 110 may include a lever recess 160 to receive a lever therein. In one example, a button such as a momentary pushbutton may be received in a recess 162 within lever recess 160, with a lever hingedly connected to apertures 164a-b of a hinge member. Lever recess 160 extends between the bottommost ridges 120, with the corresponding lever intended to be operated by one or both of a user's ring finger and pinky finger. Preferably, the lever is spring loaded so that, in the absence of applied force, the lever rotates away from lever recess 160 and particularly away from recess 162. Such configuration may be provided, for example, by a torsion spring coupled to the hinge portion of handle 110, for example in or at aperture 164a and/or aperture 164b. This structure provides a safety control, which may be referred to as a dead man's switch, in which a user must continuously depress the lever into the button received in recess 162 to operate the device connected to joystick 10. In the absence of an active grip, the spring loaded lever tends to rotate away from lever recess 160, which in turn causes the lever to stop activating the momentary push button in recess 162, causing joystick 10 to disengage from operation of the connected device. Depending on the particular connected device, disengaging the dead man's switch may result in the connected device being locked in its most recent position or to move to some default position, as desired.

Figure 3:
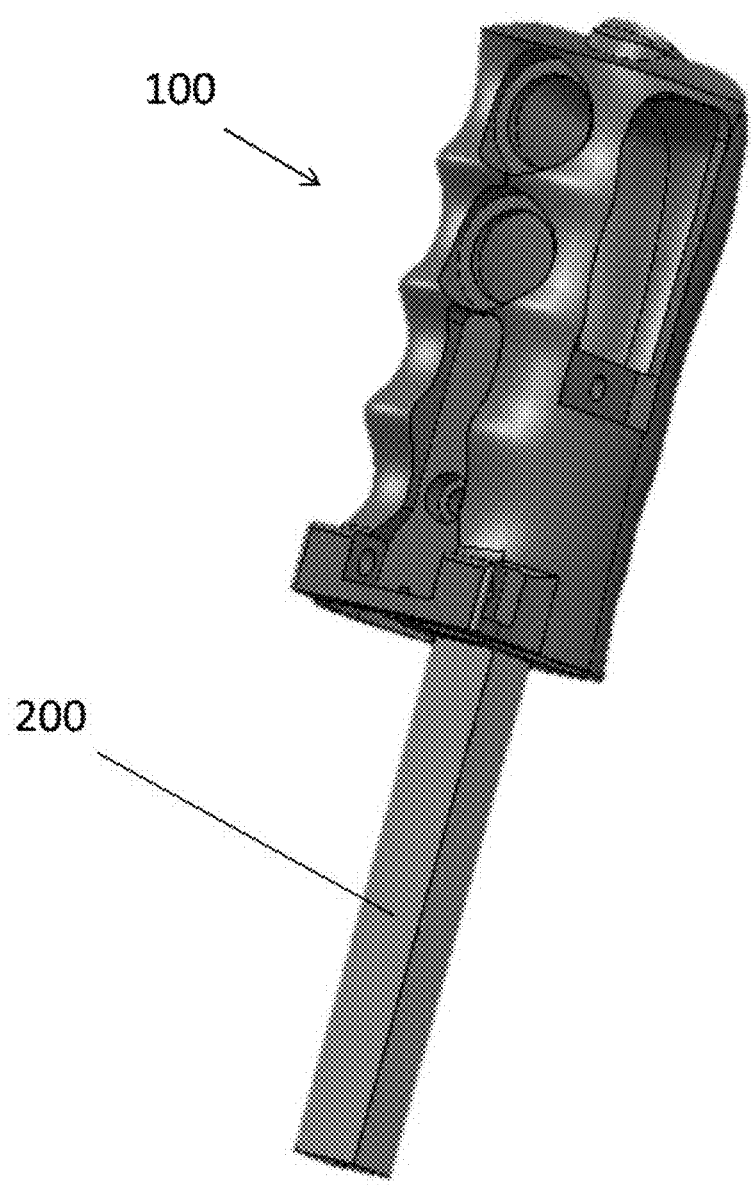
FIG. 3 is a perspective view the handgrip portion and connector portion of FIGS. 1A-B.

FIG. 3 is a perspective view of handgrip portion 100 coupled to connector portion 200 isolated from the remainder of joystick 10. Connector portion 200 may take the form of a rigid bar having at a top end portion extending into and firmly coupled to handle 110 so that operator movement of handgrip portion 100 is transmitted to sensing and hinge mechanism 300 by connector portion 200. Preferably, movement of connector portion 200 identically or otherwise corresponds to movement of handgrip portion 100. In the embodiment illustrated in FIG. 3, where connector portion 200 takes the form of a straight rectangular bar, connector portion 200 centers handgrip portion 100 over sensing and hinge mechanism 300 (best shown in FIGS. 1A-B). Connector portion 200 may have a square cross section configured be received in other system components with correspondingly shaped recesses to lock off unwanted movements and further to provide a rigid and stable connection between connector portion 200 and both handgrip portion 100 and sensing and hinge mechanism 300, as described in greater detail below. Connector portion 200 may have other dimensions and shapes for different applications. For example, connector portion is a straight bar in the vertical configuration illustrated in FIGS. 1A-B, but may have different angles in the horizontal configuration described in greater detail in connection with FIG. 7.

Figure 4A:
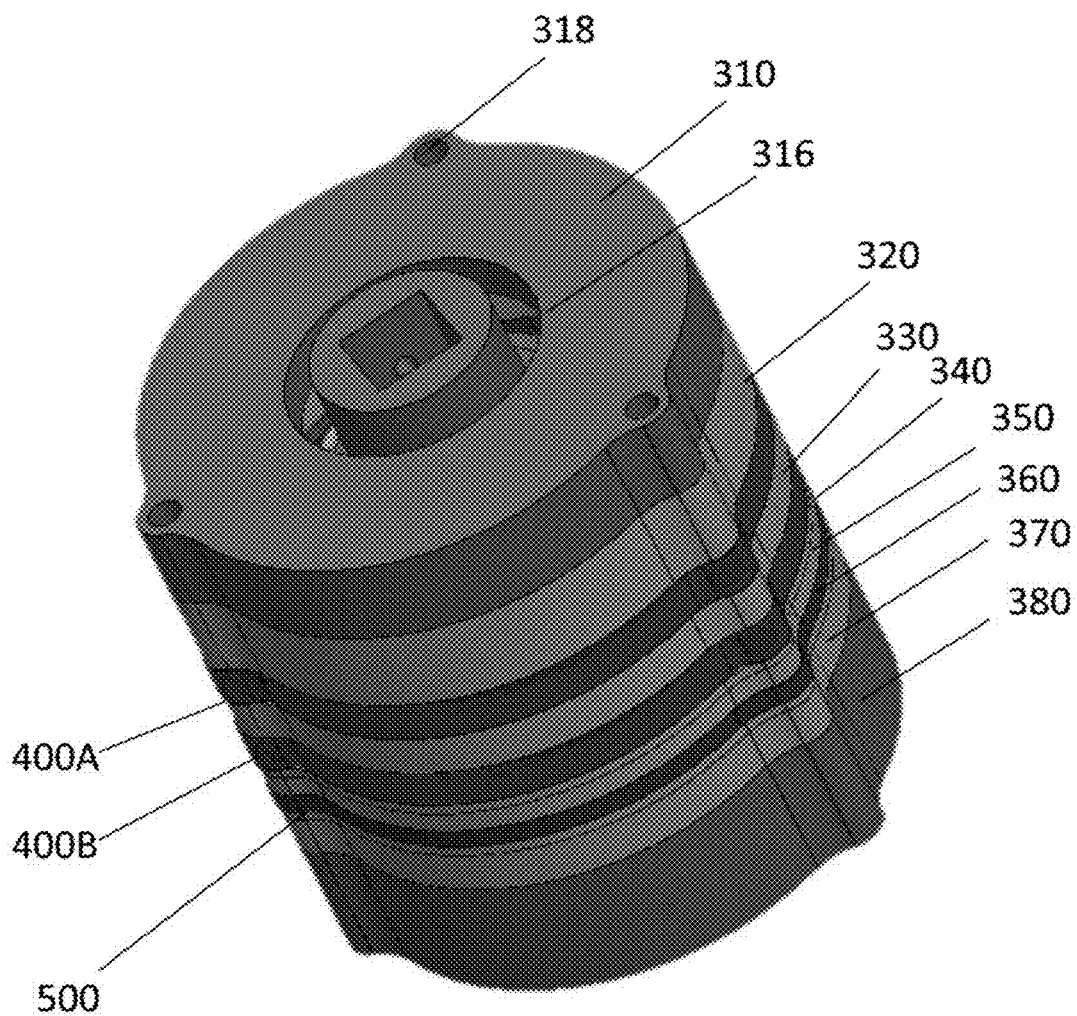
FIG. 4A is a perspective view of a sensing and hinge mechanism of the input apparatus of FIGS. 1A-B.
Figure 4B:
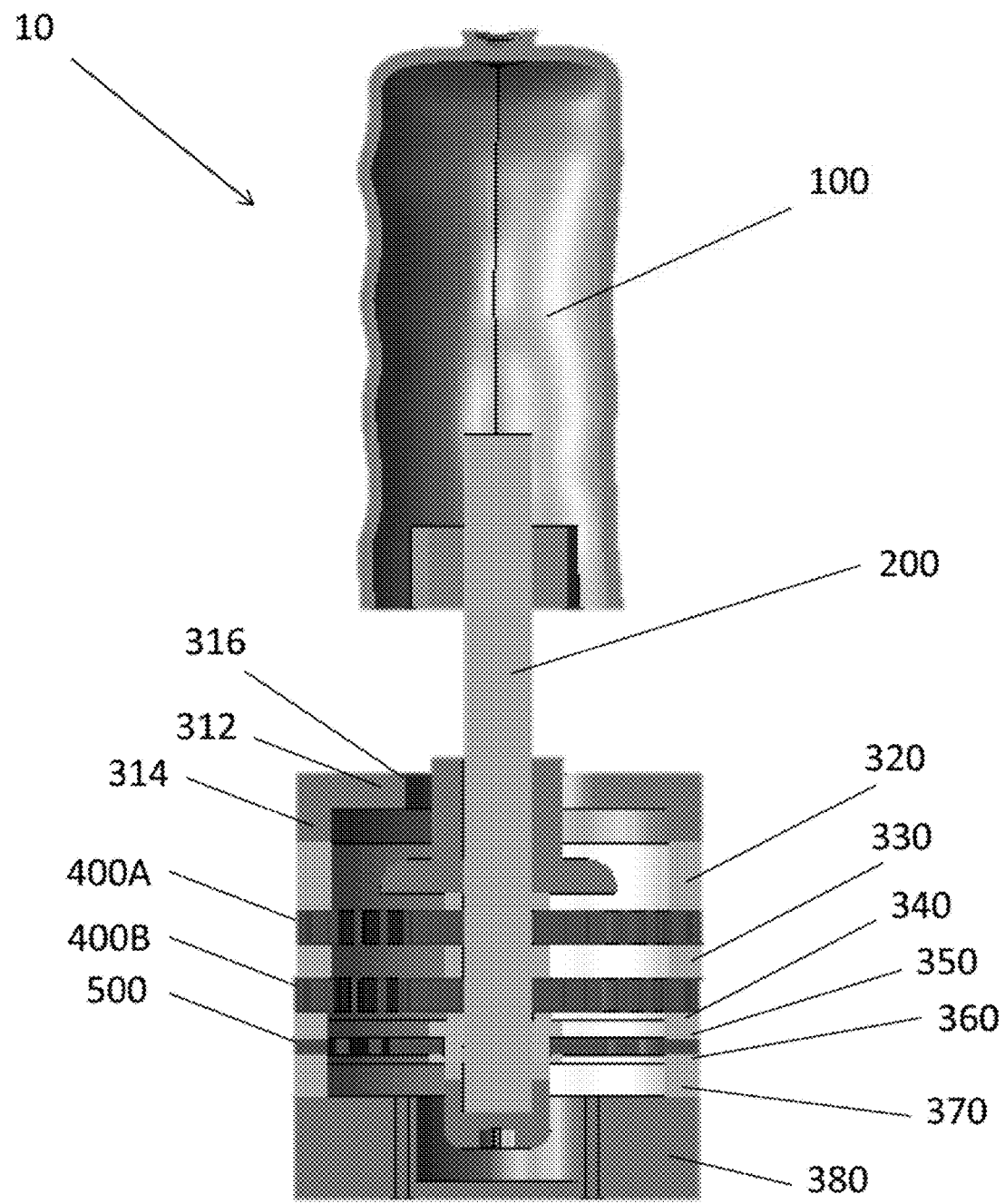
FIG. 4B is a cross section of the input apparatus of FIGS. 1A-B.

FIG. 4A illustrates a perspective view of sensing and hinge mechanism 300 with handgrip portion 100 and connector portion 200 omitted for clarity. Generally, sensing and hinge mechanism 300 may include a plurality of stacked components having, in the aggregate, outer portions configured to rigidly couple to an object such as a control panel and inner portions configured to couple to connector portion 200 and to move in a fashion corresponding to connector portion 200, with at least some of the inner portions coupled to at least some of the outer portions. FIG. 4B shows a cross section of joystick 10 along a plane passing longitudinally through the center of connecting portion 200, while FIG. 4C shows a cross section of sensing and hinge mechanism 300 along a plane parallel to, and offset from, a planar surface of connecting portion 200.

Figure 4C:
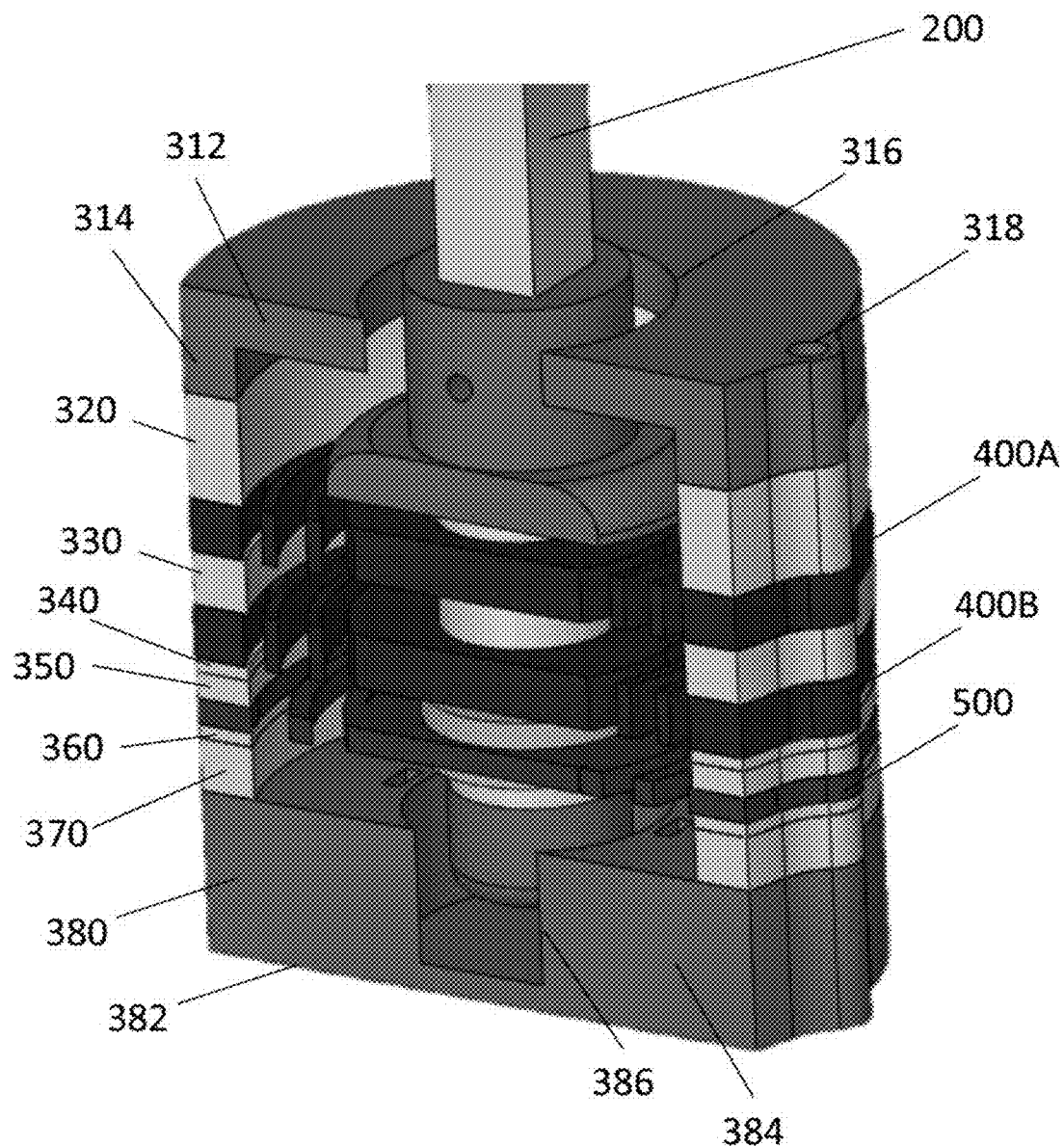
FIG. 4C is an enlarged cutaway view of the sensing and hinge mechanism of the input apparatus of FIGS. 1A-B.

Referring to FIGS. 4A-C, the components of sensing and hinge mechanism 300 that form the outer portion are described first. An outer top end cap 310 may include an annular top portion 312 with an inner circular rim 316 defining a circular opening, and an annular extension 314 extending downward from the annular top portion 312. As shown best in FIG. 4A, neither the annular top portion 312 nor annular extension 314 are perfectly circular, but rather include a plurality of extensions that define a corresponding plurality of apertures 318. In the illustrated embodiment, three apertures 318 are provided at substantially equal distances around the outer circumference of outer top end cap 310. Each component that forms part of the outer portion of sensing and hinge mechanism 300 may include identical apertures so that elements such as pins or rods may extend through apertures 318 to rigidly couple the components of the outer portion together. It should be understood that more or fewer apertures 318 may be provided as desired, but each component that forms the outer portion preferably has an identical number and position of apertures to allow for a rigid connection between those portions. As described in greater detail below, inner circular rim 316 provides a mechanical stop for the range of motion of connector portion 200, and in particular top inner end cap 610 (FIGS. 4D-E) which surrounds part of connector portion 200.

Still referring to FIGS. 4A-C, moving in a direction toward the bottom of sensing and hinge mechanism 300, the remainder of the components forming the outer portion of sensing and hinge mechanism 300 include a first outer spacer 320, a first living hinge 400A, a second outer spacer 330, a second living hinge 400B, a third outer spacer 340, a fourth outer spacer 350, an isolation living hinge 500, a fifth outer spacer 360, a sixth outer spacer 370, and a bottom outer end cap 380. Each outer spacer 320, 330, 340, 350, 360, and 370 may have the same shape with the only difference being the top-to-bottom height of the spacer. In particular, each outer spacer may be an annulus with the thickness of the annulus between the outer and inner circumferences of the outer spacer being similar or identical to that of the annular extension 314 of the top outer end cap 310. In addition, each outer spacer may include protrusions defining apertures in the same number and orientation as the apertures 318 of the top outer end cap 310. The outer spacers provide for separation between the living hinges 400A-B as well as the isolation living hinge 500, which helps ensure there is enough space for the sensors (described in greater detail below) to sense motion of the living hinges 400A-B and the isolation living hinge 500. The outer spacers further assist in keeping the top outer end cap 310, the bottom outer end cap 380, and outer portions of the living hinges 400A-B and the isolation living hinge 500 in desired positions and orientations. The top-to-bottom height of each outer spacer may be dependent upon the particulars of the system, but in the illustrated embodiment outer spacer 320 may have a height of approximately 0.5 inches, outer spacers 330 and 370 may each have a height of approximately 0.25 inches, outer spacer 340 may have a height of approximately 0.0625 inches, outer spacer 350 may have a height of approximately 0.125 inches, and outer spacer 360 may have a height of approximately 0.0674 inches. It should further be understood that the use of two adjacent outer spacer pairs, such as outer spacers 340 and 350, as well as outer spacers 360 and 370, is not necessary and could be replaced by a single outer spacer having the desired thickness.

Bottom outer end cap 380 may include a circular bottom portion 382 with an annular extension 384 extending upward from the circular bottom portion 382 and defining an inner circular rim 386 with a circular opening. As described in greater detail below, inner circular rim 386 provides a mechanical stop for the range of motion of connector portion 200, and in particular inner bottom end cap 660 (FIGS. 4D-E) which surrounds the bottom of connector portion 200.

Figure 4D:
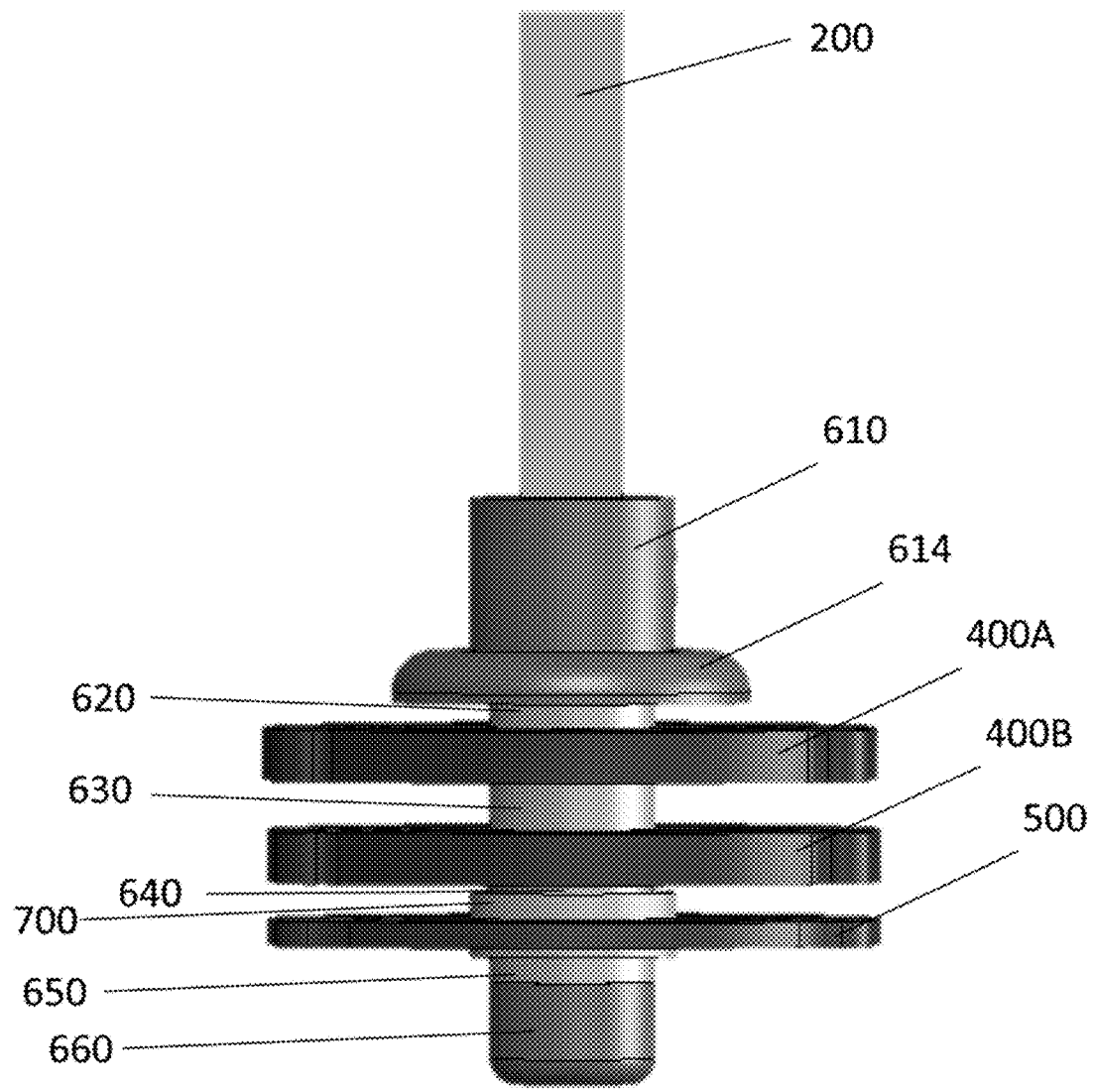
FIGS. 4D-E are side and perspective views, respectively, of the connector portion and sensing and hinge mechanism of the input apparatus of FIGS. 1A-B with portions of the sensing and hinge mechanism omitted.
Figure 4E:
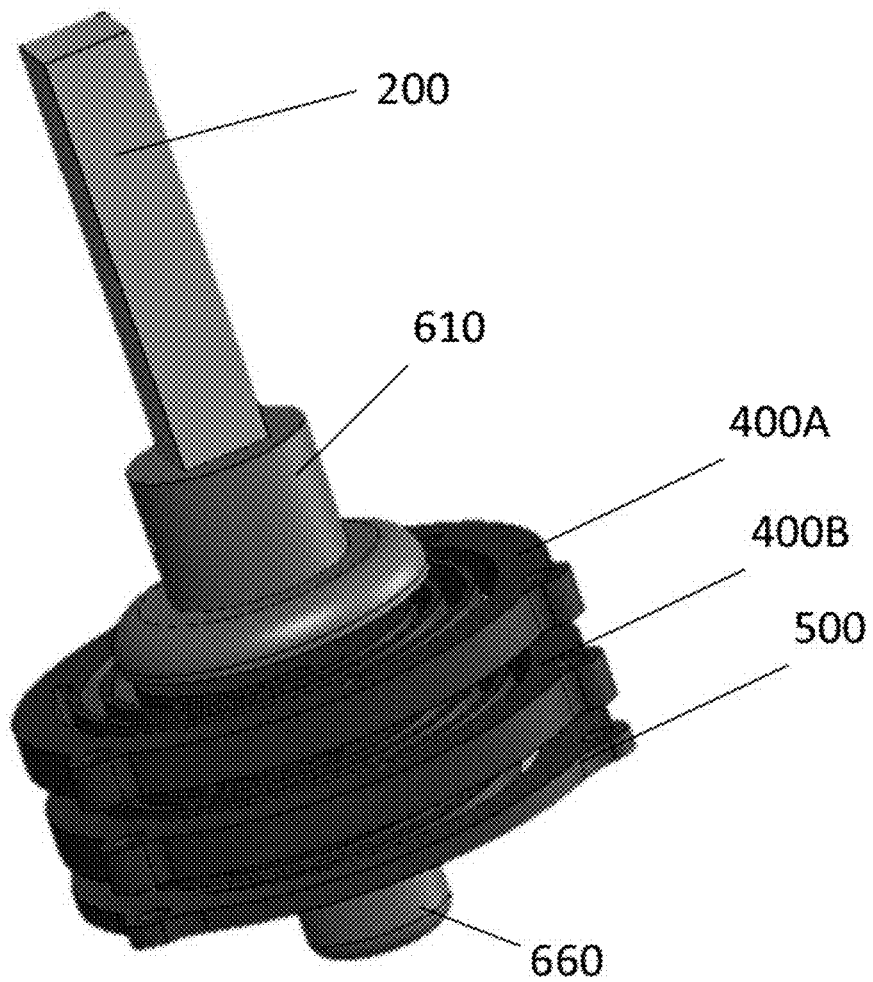

FIGS. 4D-E are side and perspective views, respectively, of connector portion 200 and sensing and hinge mechanism 300 with top outer end cap 310, bottom outer end cap 380, and the outer spacers omitted from the view. A top inner end cap 610 may include a top cylindrical portion having a square-shaped bore to snugly receive connector portion 200. Top inner end cap 610 may also include a bottom flange portion 614 having a diameter greater than the diameter of the inner circular rim 316 of top outer end cap 310 to restrict the ability of top inner end cap 610 from exiting top outer end cap 310. As a user moves handgrip portion 100 and thus connector portion 200, the top cylindrical portion of top inner end cap 610 also moves, with the extent of the motion being limited by contact between the top cylindrical portion of top inner end cap 610 and the inner circular rim 316 of top outer end cap 310. The circular configuration of the circular rim 316 of top outer end cap 310 and top cylindrical portion of top inner end cap 610 provides that, even in the case when an operator moves the connector portion 200 to the mechanical limit in which top inner end cap 610 contacts top outer end cap 310, a smooth compound movement may still be produced.

Still referring to FIGS. 4D-E, moving in a direction toward the bottom of sensing and hinge mechanism 300, the remainder of the components forming the inner portion of sensing and hinge mechanism 300 include a first inner spacer 620, the first living hinge 400A, a second inner spacer 630, the second living hinge 400B, a third inner spacer 640, disc system 700 onto which the isolation living hinge 500 is mounted, a fourth inner spacer 650, and a bottom inner end cap 660. Each inner spacer 620, 630, 640, and 650 may be generally cylindrical and have similar diameters, with a square bore through the center of each for snugly receiving connector portion 200. The inner spacers have a similar function as the outer spacers, for example providing for separation between the living hinges 400A-B as well as the isolation living hinge 500, and assisting in keeping the top inner end cap 610, the bottom inner end cap 660, and inner portions of the living hinges 400A-B and the isolation living hinge 500 in desired positions and orientations. The top-to-bottom height of each inner spacer may be dependent upon the particulars of the system, but in the illustrated embodiment inner spacers 620 and 650 may each have a height of approximately 0.125 inches, inner spacer 630 may have a height of approximately 0.25 inches, and inner spacer 640 may have a height of approximately 0.0625 inches.

Bottom inner end cap 660 may by generally cylindrical with a square bore extending through the center to receive the bottom end of connector portion 200. Preferably, the bottom end of bottom inner end cap 660 is solid and connector portion 200 does not protrude through the bottom end of bottom inner end cap 660. As a user moves handgrip portion 100 and thus connector portion 200, the bottom inner end cap 660 also moves, with the extent of the motion being limited by contact between the bottom inner end cap 660 and the inner circular rim 386 of bottom outer end cap 380. The circular configuration of the bottom inner end cap 660 and the inner circular rim 386 provides that, even in the case when an operator moves the connector portion 200 to the mechanical limit in which bottom inner end cap 660 contacts bottom outer end cap 380, a smooth compound movement may still be produced.

Figure 5:
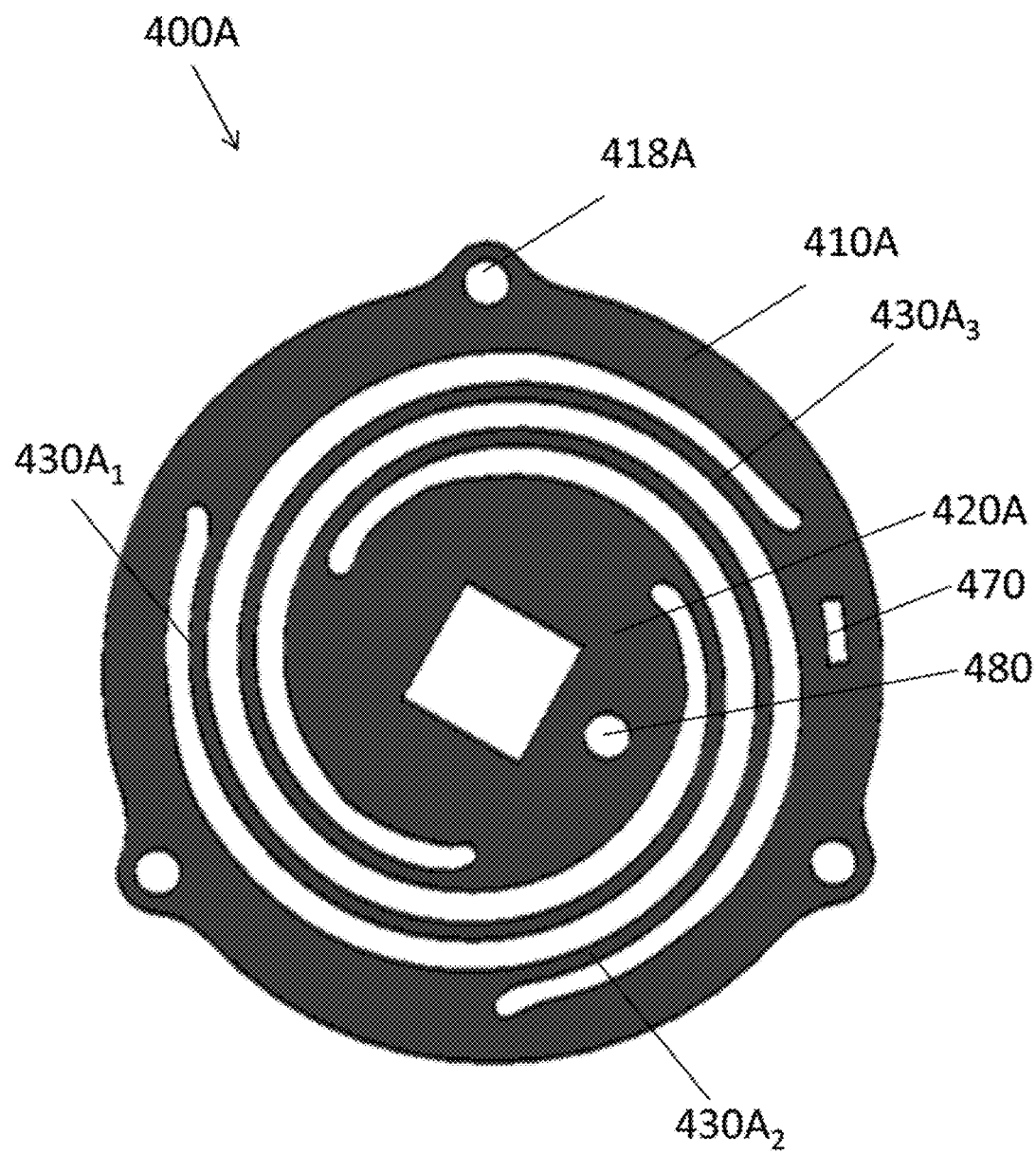
FIG. 5 is a top view of the living hinge of the sensing and hinge mechanism of FIG. 4A.

FIG. 5 is a top view of living hinge 400A. It should be understood that living hinge 400B may be identical in structure to living hinge 400A, so the details described in connection with living hinge 400A apply with equal force to living hinge 400B, with the sole exception of the positioning of the living hinges 400A and 400B with respect to the remaining components of joystick 10. In general, the living hinges 400A and 400b couple the outer portions of the sensing and hinge mechanism 300 to the inner portions of the sensing and hinge mechanism 300 (and thus the connector portion 200 and handgrip portion 100) and further provide a spring force within a defined three dimensional space. Living hinge 400A includes an outer ring portion 410A and an inner disc portion 420A. Outer ring portion 410A is generally in the form of a circular rim having a plurality of extensions defining apertures 418A in the same number and configuration as the other outer components of sensing and hinge mechanism 300. As noted above, pins or other retaining members may be inserted through the apertures 418A of living hinge 400A and through the corresponding apertures in the remaining outer components of sensing and hinge mechanism 300 to rigidly couple the outer components of sensing and hinge mechanism 300 to each other and also to provide a rigid connection to a control panel or work surface or other component to which joystick 10 is intended to be attached.

Inner disc portion 420A of living hinge 400A may be substantially circular with a square bore extending through the center of inner disc portion 420A to snugly receive connector 200 therethrough. Inner disc portion 420A is coupled to outer ring portion 410A by a plurality of arced beams. In the illustrated embodiment, three arced beams $430A_1$, $430A_2$, and $430A_3$ couple inner disc portion 420A to outer ring portion 410A. The arced beams $430A_{1-3}$ allow inner disc portion 420A to move with respect to outer ring portion 410A in six degrees of freedom (three linear degrees, three rotational degrees) when outer ring portion 410A is rigidly coupled to the remainder of sense and hinge mechanism 300 and when connector portion 200 is positioned within the bore of inner disc portion 420A. The arced beams $430A_{1-3}$ provide a spring force which resists linear and rotational movement, biasing living hinge 400A to its original shape and position shown in FIG. 5. The spring force provided by living hinge 400A is generated by the material and geometric properties of the arced beams $430A_{1-3}$, which allows for constant tension in each axis of movement. The arced beams $430A_{1-3}$ may be formed from materials the produce desirable spring forces, which may include, for example, nylon, polypropylene, polycarbonate, acrylonitrile butadiene styrene ("ABS"), carbon fiber, steel, aluminum, titanium, urethane, UV resins, and combinations thereof. Living hinge 400A may include other optional apertures or through holes including, for example, first optional aperture 470 and second optional aperture 480. First optional aperture 470 may be rectangular and provide for a pathway for wires to extend from Hall effect sensors and/or any handgrip sensors and buttons to the electronics, for example an electronics housing similar to electronics housing 390" described in connection with FIG. 11. Second optional aperture 480 may provide for mounting of living hinge 400A during the manufacturing process.

As noted above, the arced beams $430A_{1-3}$ provide for relative movement between inner disc portion 410A and outer ring portion 420A in six degrees of freedom, which may be conventionally referred to as the X, Y, and Z axis as well as rotation around the X, Y, and Z axes. The spring constant ("k" value in Hooke's law) in each of the six axes of movement may be determined, at least in part, by the material properties of the arced beams $430A_{1-3}$, as well as the particular length, positioning, thickness, and total number of arced beams. It should be understood that although three arced beams $430A_{1-3}$ are provided in the illustrated embodiment, more or fewer arced beams may be provided, at different or similar positions, to provide desired spring properties to the living hinge. The arced walls $430A_{1-3}$ each generally extend in a spiraling fashion extending at a tangent from the outer circumference of inner disc portion 420A and also at a tangent from the inside of outer ring portion 410A. Preferably, there is a defined distance between the outer ring portion 410A and inner disc portion 420A so that when the inner disc portion 420A is rotated about the Z-axis (the Z-axis extends longitudinally through the center of living hinge 400A), the arced beams 430A$_{1-3}$ rotate with the inner disc portion 420A.

As noted above, in the absence of applied force, living hinges 400A and 400B tend to hold connector portion 200 (and handgrip portion 100 in the illustrated vertical embodiment) in a centered position with respect to sensing and hinge mechanism 300. As the user grips and moves handgrip portion 100, connector portion 200 correspondingly moves and causes inner disc portion 420B of living hinge 400A (and a corresponding inner disc of living hinge 400B) to move with respect to the outer portions of sensing and hinge mechanism 300. As the user continues to move handgrip portion 100 and connector portion 200 in a given direction, the resistance (also known as restoring force) increases, which among other things provides tactile feedback to the user regarding the amount of force the user is applying to joystick 10 in a particular direction. Sensors, such as force sensors, may be employed in sensing and hinge mechanism 300 with respect to living hinge 400A (and correspondingly to living hinge 400B) so that the amount of force in each direction applied to the living hinges 400A and 400B is sensed, with the sensed information being output in order to provide corresponding control of the device connected to joystick 10 to produce the desired movements. Other sensors that may be employed in addition or alternatively to force sensors are resistance sensors, optical sensors, acoustic sensors, pneumatic sensors, and/or magnetic sensors. For example, in one configuration a plurality of Hall effect sensors, for example eight Hall effect sensors, may be embedded within bottom outer end cap 380. A plurality of magnets may be mounted around the outside of inner bottom end cap 660, for example four magnets may be positioned equidistantly around the circumference of inner bottom end cap 660. The movement of the magnets on inner bottom end cap 660 relative to the Hall effect sensors in bottom outer end cap 380 is sensed by the sensors, which accurately sense linear motion in three dimensions as well as rotational motion in at least two dimensions. In certain embodiments, for example in which a single magnet is coupled to a distal end of inner bottom end cap 660, rotation about the Z-axis (i.e. rotation about the longitudinal axis of connector portion 200) may not easily be detected because there is little relative movement between such magnet and any Hall effect sensors. In such an embodiment, rotation about the Z-axis may be detected via isolation living hinge 500, described in greater detail below.

It should be noted that, although living hinge 400A and 400B may be nearly identical, the rectangular bore holes through the center of living hinge 400A may be rotationally offset from the rectangular bore through the center of living hinge 400B, for example between about one degree and about five degrees, including about three degrees. With such an offset, for example about three degrees, when living hinges 400A and 400B are coupled to connector portion 200 and fasteners couple the living hinges 400A and 400B to one another via the extension apertures (e.g. 418A), the living hinges become pre-tensioned. This pre-tensioning provides greater restoring force when connector portion 200 is rotated about the Z-axis. Without this pre-tensioning, it may be too easy for a user to rotate connector portion 200 about the Z-axis, which could lead to unintentional or uncontrolled rotation of the connector portion 200 about the Z-axis by the user. In certain embodiments, for example in the embodiment described in connection with FIG. 7, this pre-tensioning may help offset the weight of the handgrip portion 100.

Figure 6A:
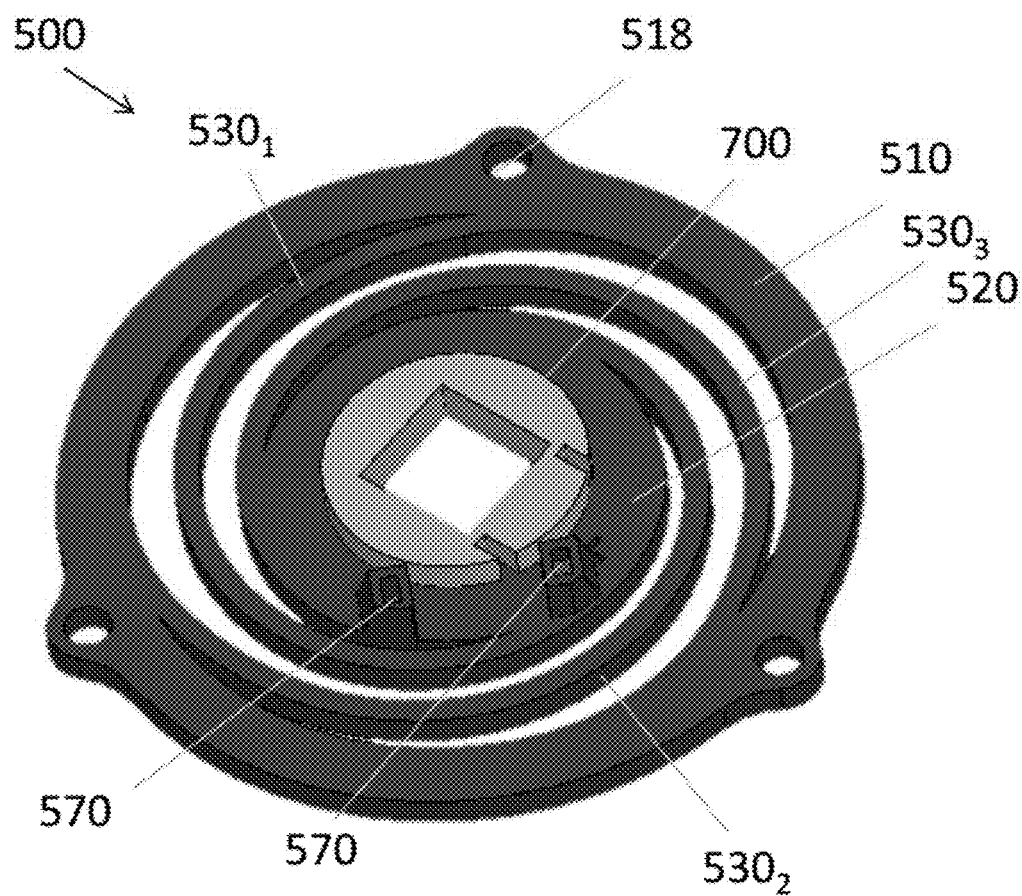
FIG. 6A is a top perspective view of the isolation living hinge of the sensing and hinge mechanism of FIG. 4A.

FIG. 6A is a top perspective view of isolation living hinge 500. Isolation living hinge 500 has a similar structure to living hinges 400A-B with some key differences. Isolation living hinge 500 includes an outer ring portion 510 and an inner disc portion 520. Outer ring portion 510 is generally in the form of a circular rim having a plurality of extensions defining apertures 518 in the same number and configuration as the other outer components of sensing and hinge mechanism 300. As noted above, pins or other retaining members may be inserted through the apertures 518 of isolation living hinge 500 and through the corresponding apertures in the remaining outer components of sensing and hinge mechanism 300 to rigidly couple the outer components of sensing and hinge mechanism 300 to each other and also to provide a rigid connection to a control panel or work surface or other component to which joystick 10 is intended to be attached.

Inner disc portion 520 is coupled to outer ring portion 510 by a plurality of arced beams. In the illustrated embodiment, three arced beams $530_1$, $530_2$, and $530_3$ couple inner disc portion 520 to outer ring portion 510. The arced beams $530_{1-3}$ may be substantially identical to the counterpart arced beams 430A$_{1-3}$ of living hinge 400A. Similar to living hinges 400A-B, the arced beams $530_{1-3}$ allow inner disc portion 520 to move with respect to outer ring portion 510, but only with five degrees of freedom (three linear degrees, two rotational degrees) when outer ring portion 510 is rigidly coupled to the remainder of sense and hinge mechanism 300 and when connector portion 200 is positioned through inner disc portion 520. As described below, this provides the ability of isolation living hinge 500 to isolate rotational movement around the Z axis from movement in the other degrees of freedom.

Figure 6B:
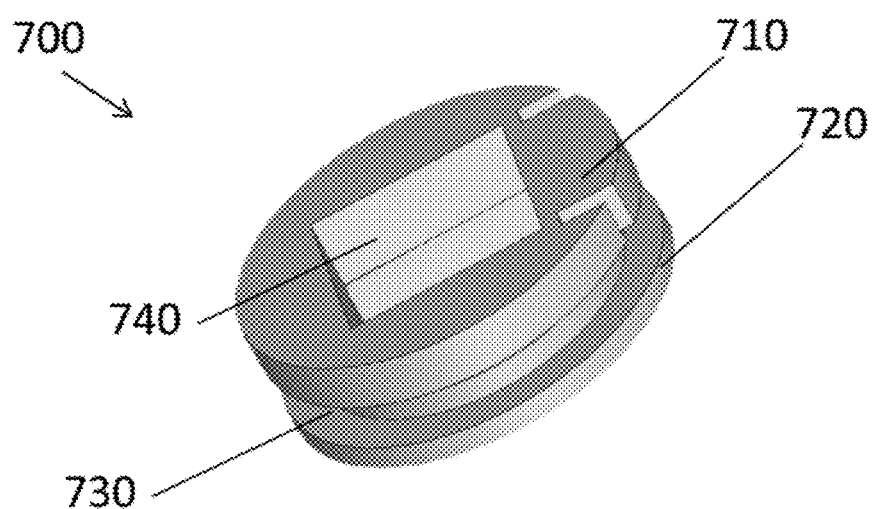
FIG. 6B is a perspective view of a disc system of the isolation living hinge of FIG. 6A.

Unlike living hinge 400A, isolation living hinge 500 includes a substantially circular bore through the center of inner disc portion 520. A disc system 700 is positioned through inner disc portion 520. Disc system 700 may be formed of one or more pieces, but two pieces may be preferable for ease of assembly. In particular, and as best seen in FIG. 6B, disc system 700 includes a top or first member 710 and a bottom or second member 720. First member 710 may have a first portion with a first diameter greater than the diameter of the circular bore through the center of inner disc portion 520, and a second portion with a diameter substantially equal to the diameter of the circular bore through the center of inner disc portion 520. The second member 720 may have a similar configuration as the first member, so that when the first member 710 is joined to the second member 720, a circumferential groove 730 is formed in disc system 700. Preferably, the height of groove 730 is substantially similar to the height of the inner disc portion 520 so that when disc system 700 is assembled to inner disc portion 520, disc system is free to rotate about the Z axis (the axis longitudinally extending through the center of isolation living hinge 500) but cannot move in any other fashion with respect to isolation living hinge 500. Disc system 700 also defines a square bore 740 to snugly receive connector portion therethrough.

With the configuration of isolation living hinge 500 described above, any movement of connector portion 200 while it is inserted through disc system 700 and isolation living hinge 500 will be transferred to isolation living hinge 500, with the exception of rotation about the Z axis. Rotation of connector 200 about the Z axis will cause disc system 700 to rotate about the Z axis, but that rotation is not transferred to isolation living hinge 500. With this configuration, angular change of disc system 700 and connector portion 200 about the Z axis relative to isolation living hinge 500 may be precisely measured. In one example, one or more magnets are mounted to disc system 700 and a Hall effect sensor is mounted on the inner disc portion 520 of isolation living hinge 500. The rotation of disc system 700 is thus transferred to the magnets mounted to the disc system, with rotation of the magnets about the Z axis direction with respect to the Hall effect sensor mounted on inner disc portion 520, allowing precise measurement of the Z axis rotation. Alternately, magnets may be mounted to inner disc portion 520, for example within protrusions 570, with a Hall effect sensor mounted to disc system 700.

It should be understood that once the relevant sensors within sensing and hinge mechanism 300 detect movement of connector portion 200 via handgrip portion 100, the sensed information may be transferred and/or processed with instructions sent to the connected device to cause corresponding movements of the connected device in any desired manner. For example, joystick 10 may have a wired connection to the connected device, a wireless connection to the connected device, or a wired or wireless connection to another device, such as a computer or processor, which itself has a wired or wireless connection to the connected device.

Figure 7:
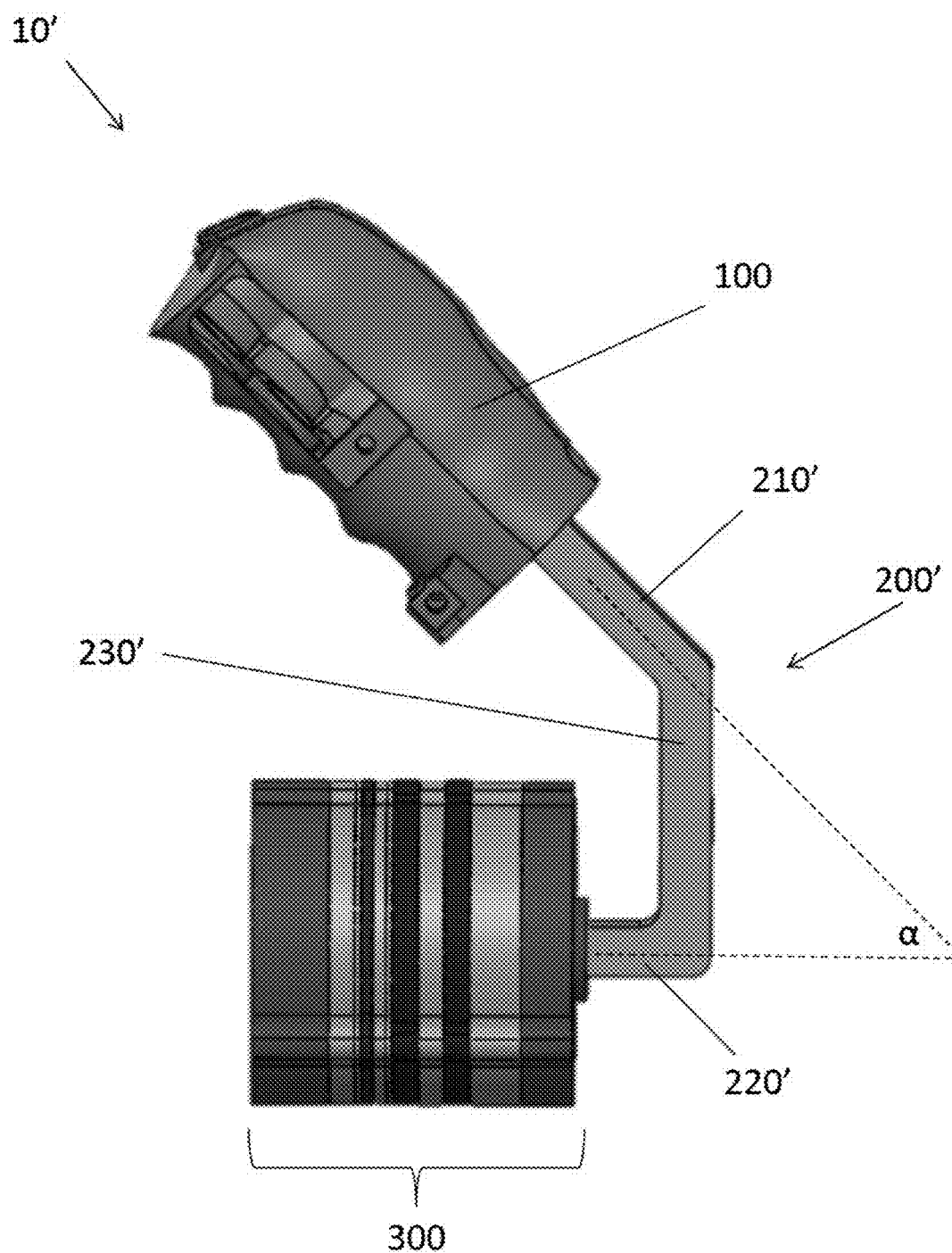
FIG. 7 is a perspective view of a horizontal input apparatus according to another aspect of the disclosure.

FIG. 7 illustrates an input apparatus 10' according to another embodiment of the disclosure. Generally, input apparatus 10' takes the form of a horizontal joystick, as opposed to the vertical joystick of FIGS. 1A-B. In particular, joystick 10' includes a handgrip portion 100 and a sensing and hinge mechanism 300 identical to the corresponding parts of joystick 10. As such, the handgrip portion 100 and sensing and hinge mechanism 300 are not described again. However, connector portion 200' is different than the corresponding connector portion 200 of joystick 10, with joystick 10' being configured for horizontal use. In other words, connector portion 200' is still a rigid bar having at a top end portion extending into and firmly coupled to handgrip portion 100 so that operator movement of handgrip portion 100 is transmitted to sensing and hinge mechanism 300 by connector portion 200'. However, rather than taking the form a straight rectangular bar, connector portion 200' takes the form of a rectangular bar, preferably with a square cross section, that includes one or more angles to angle handgrip portion 100 relative to sensing and hinge mechanism 300. The horizontal configuration shown may provide an increased level of comfort and ease of operation to the user. For example, in the illustrated embodiment, connecting portion 200' may include a first end portion 210' substantially longitudinally aligned with handgrip portion 100, a second end portion 220' substantially longitudinally aligned with sensing and hinge mechanism 300, and a middle portion 230' connecting the first end portion 210' and the second end portion 220'. In particular, it has been found that an angle α between first end portion 210' and second end portion 220' of between about 10 degrees and about 30 degrees, and particularly an angle α of about 20 degrees, provides optimized comfort and ease of operation to a user.

Figure 8A:
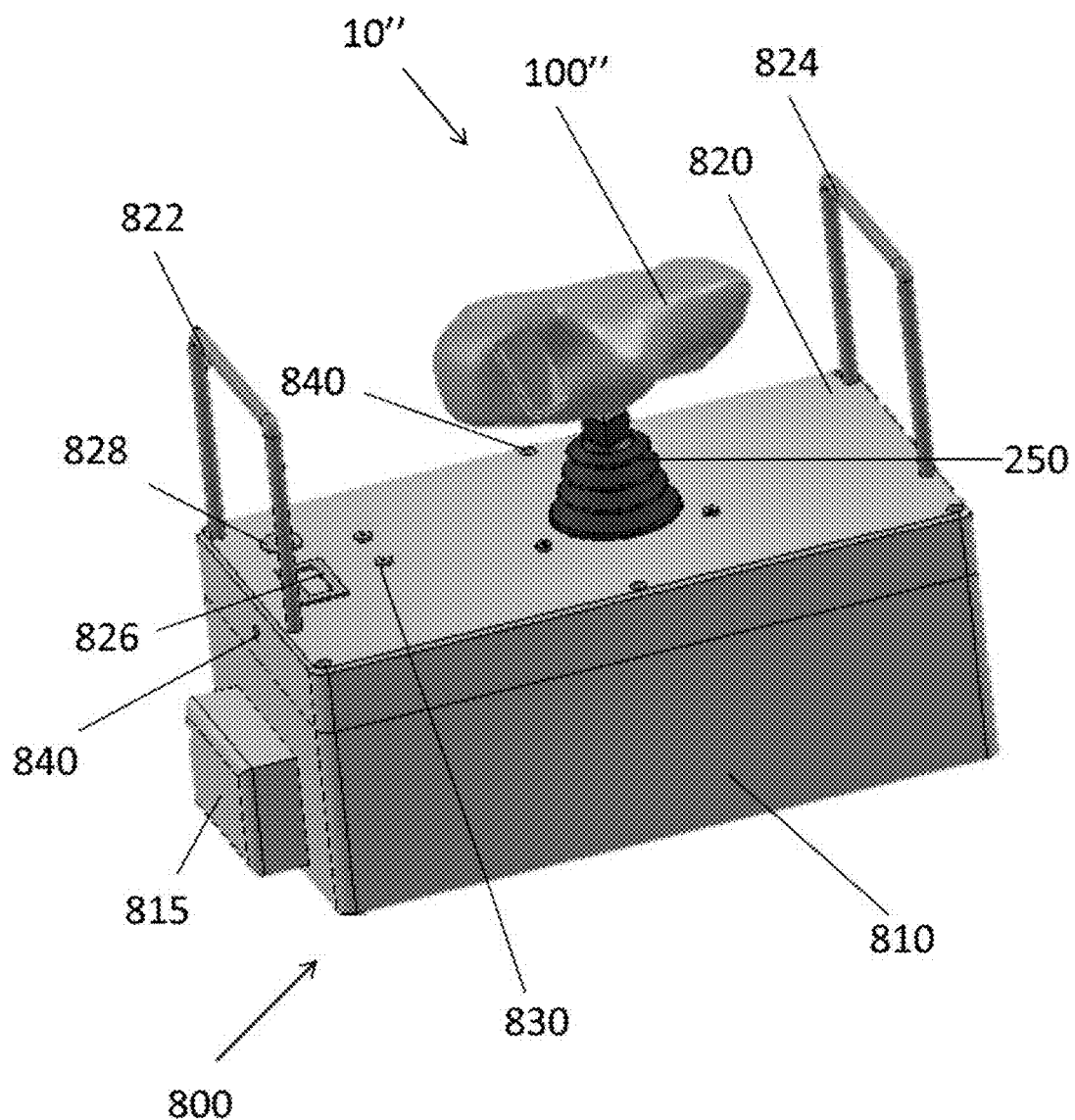
FIG. 8A is a perspective view of an input apparatus coupled to an enclosure according to a further aspect of the disclosure.

FIG. 8A illustrates an input apparatus 10" according to another embodiment of the disclosure. Generally, input apparatus 10" takes the form of a vertical joystick similar to joystick 10 of FIGS. 1A-B. Joystick 10" is illustrated as coupled to an enclosure system 800, generally including a bottom casing 810 and a top casing 820. It should be understood that joysticks 10 and 10' may be used with similar types of enclosure systems. A battery may be contained in battery enclosure 815 to provide power to electronics (e.g. sensors, etc.) in sensing and hinge mechanism 300", described in greater detail below. Bar extensions 822 and 824 may extend upwards from top casing 820 and provide for a level of protection of input apparatus 10" if a user unintentionally drops the enclosure 800. Enclosure 800 may include other features, for example including a power switch 826 and an LED indicator 828 on the top casing 820. Top casing 820 may include other structures, such as structures for use with a potentiometer 830 or other sensors. A pair of connection features 840 (only one visible in FIGS. 8A-B) may be provided in top casing 820, for example to provide attachment points for rings or similar structures for a strap system, such as a shoulder strap, so that a user may carry enclosure system 800 easily.

Joystick 10" includes a handgrip portion 100" coupled to a sensing and hinge mechanism 300" via a connector portion 200. Portions of joystick 10" that are identical to components of joystick 10 are provided with the same reference numeral, whereas similar but non-identical components are provided with the corresponding reference numeral of the component of joystick 10 with double primes added to the reference number. Joystick 10" is coupled to enclosure 800 so that handgrip portion 100" extends completely above top casing 820, connector portion 200 extends through top casing 820, and sensing and hinge mechanism 300" is mostly or entirely within enclosure 800 and rigidly coupled to the top casing 820. A flexible bellows 250, which may be made of rubber or the like, may surround the portion of connector portion 200 extending above top casing 820.

Figure 8B:
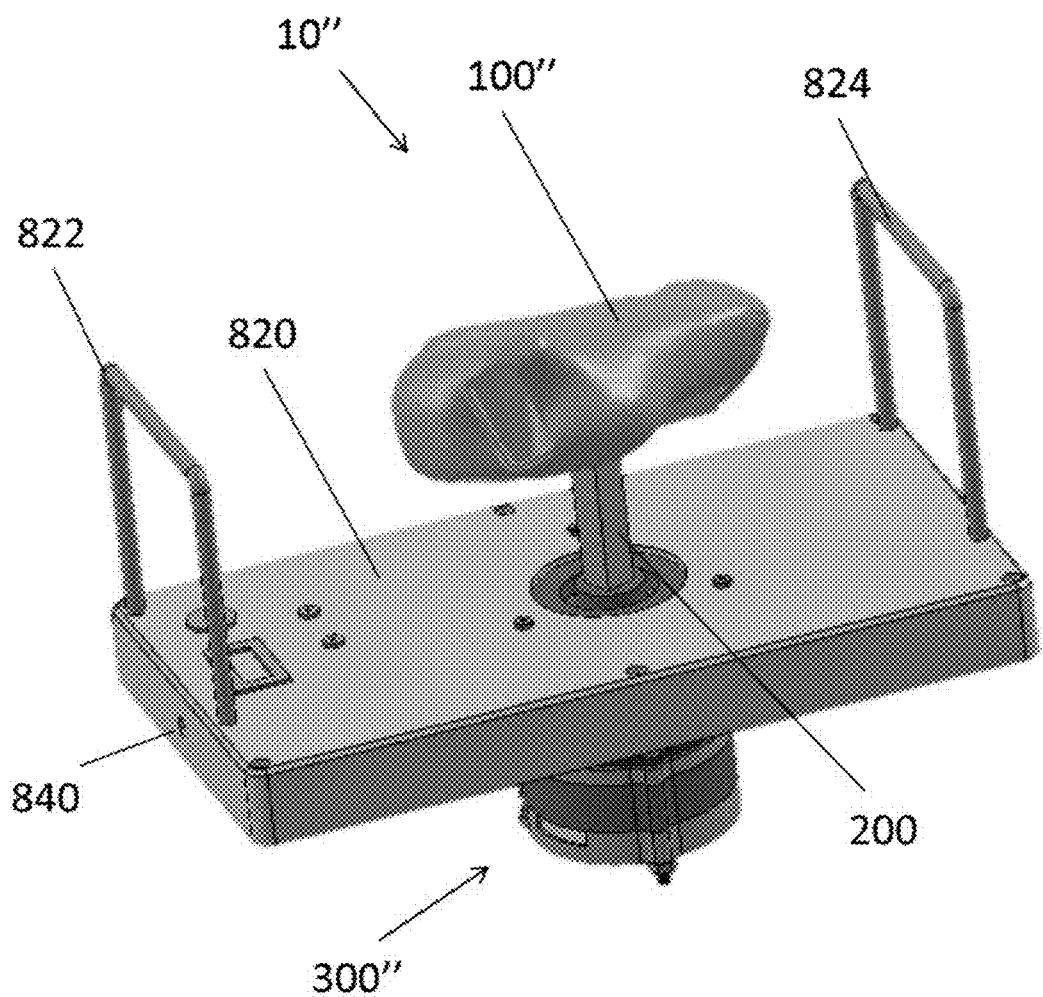
FIG. 8B is a perspective view of FIG. 8A with certain components omitted form the view.

FIG. 8B illustrates input apparatus 100" coupled to enclosure 800 with bellows 250 and bottom casing 810 removed from the illustration. As is described in greater detail below, outer top end cap 310" of sensing and hinge mechanism 300" may be coupled directly to top casing 820, for example with screws or bolts, with the remainder of sensing and hinge mechanism 300" being coupled together in a similar fashion as described with respect to sensing and hinge mechanism 300. It should be understood that other components, such an antenna for wireless communication, may be positioned within enclosure 800.

Figure 9A:
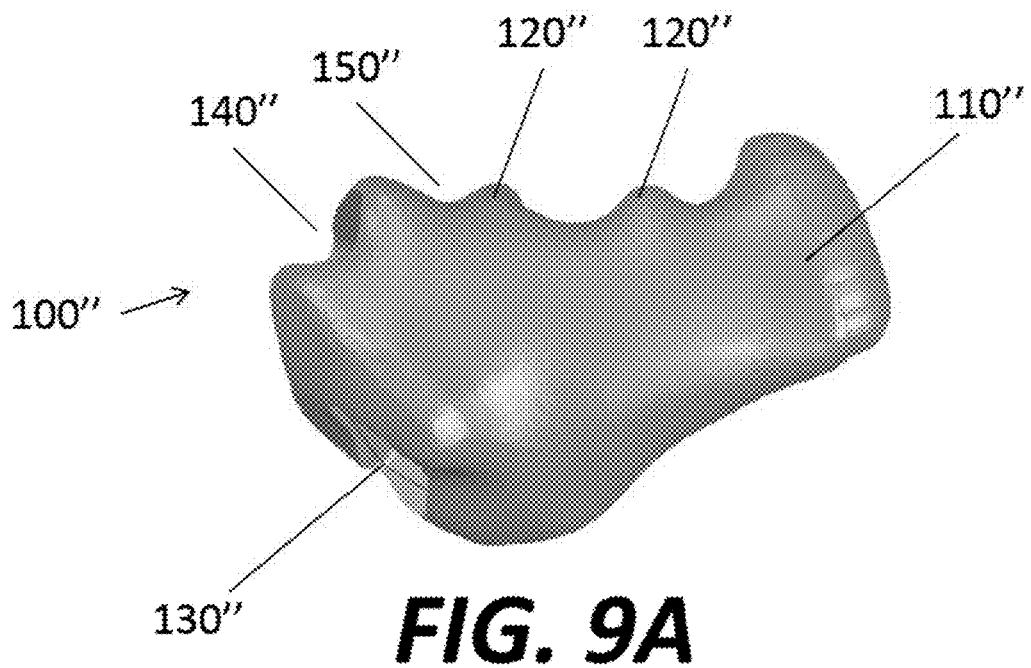
FIGS. 9A-C are various views of a handgrip portion of the input apparatus of FIGS. 8A-B.
Figure 9B:
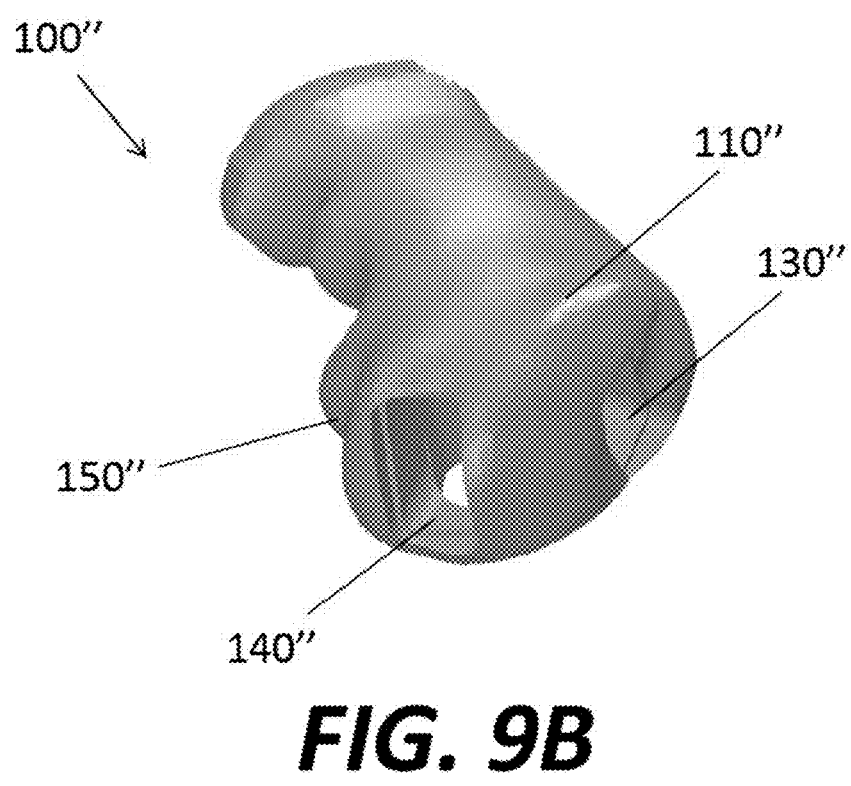
Figure 9C:
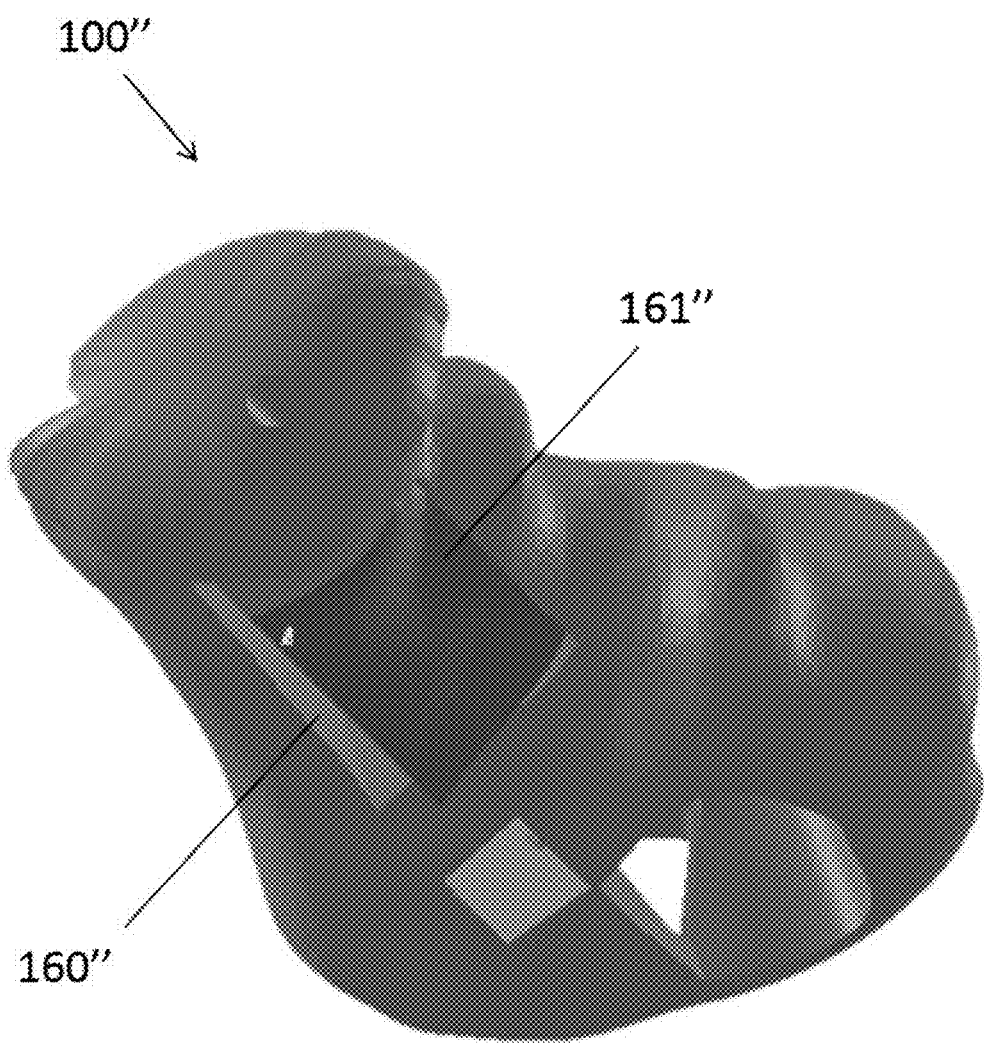

FIGS. 9A-C illustrate different views of handgrip portion 100" isolated from the rest of joystick 10". It should be understood that handgrip portion 100" is illustrated for use with a right hand of a user, but a mirror image of the same design may be used for a left-handed configuration. Handgrip portion 100" is sized and shaped to be held by an operator to move in three-dimensional space to control up to six degrees of motion of the device operably connected to joystick 10". Handgrip portion 100" may generally include a casing or handle 110" so that user's palm faces toward connector portion 200 during use. Handle 110" may include a plurality of ridges 120" to provide a better grip to the user and to help the user locate each finger in the appropriate position for operating joystick 10".

Handle 110" may include a number of apertures, slots, grooves, or other features so that buttons, actuators, sensors, etc. may be provided on handle 110". For example, a first aperture 130" may receive a button or sensor such as a thumb wheel or other button intended to be activated by a user's thumb. A second aperture 140" may be positioned to receive a button intended to be controlled by a user's index finger, with a third aperture 150" being positioned to receive a button intended to be controlled by a user's middle finger. These buttons may have any desired functionality, including any of the functionality described in connection with handle 110. A bottom portion of handle 110", as best shown in FIG. 9C, may include a lever recess 160" to receive a lever 161" therein. The lever 161" may be a dead man's switch similar to that described in connection with handle 110. For example, lever 161" may be hingedly coupled to handle 110"

and biased, for example by a spring, to pivot away from the handle 110" so that, in the absence of applied force, lever 161" remains in an non-activated condition.

Figure 10:
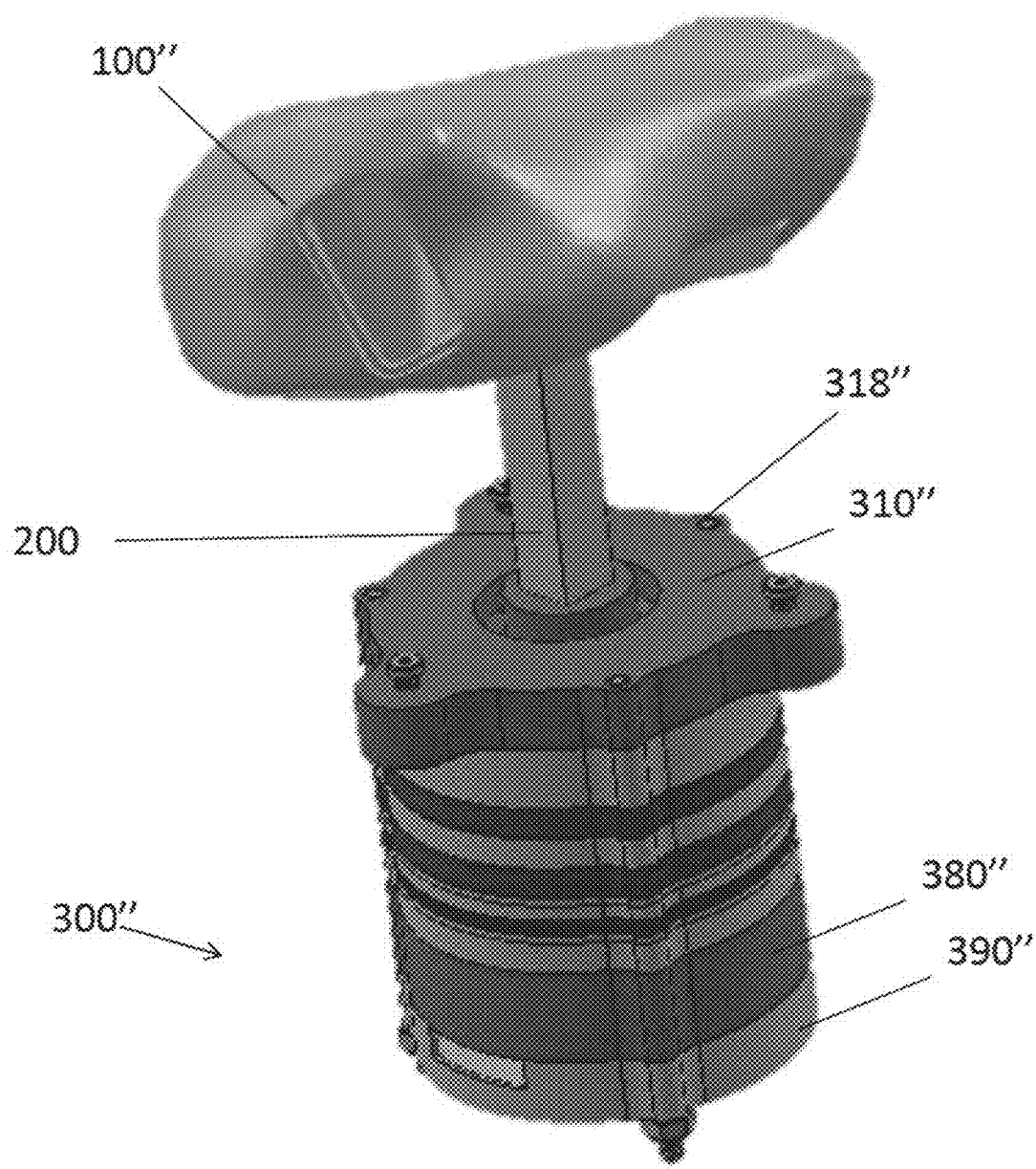
FIG. 10 is a perspective view of the input apparatus of FIGS. 8A-B isolated from the enclosure of FIGS. 8A-B.

FIG. 10 illustrates joystick 10" with enclosure 800 and bellow 250 removed for clarity of illustration. Sensing and hinge mechanism 300" may be identical to sensing and hinge mechanism 300, except for the differences explicitly described. Top outer end cap 310" may include additional extensions for receiving screws to fasten top outer end cap 310" to top casing 820 of enclosure 800. The remaining apertures 318" may be similar or identical to apertures 318 of sensing and hinge mechanism 300. With this configuration, a first set of fasteners may couple the components of sensing and hinge mechanism 300" together, with a second set of fasteners coupling the sensing and hinge mechanism 300" to the enclosure 800. This provides the benefit that sensing and hinge mechanism 300" may be easily uncoupled from the enclosure 800 without needing to uncouple the components of sensing and hinge mechanism 300" from one another.

Figure 11:
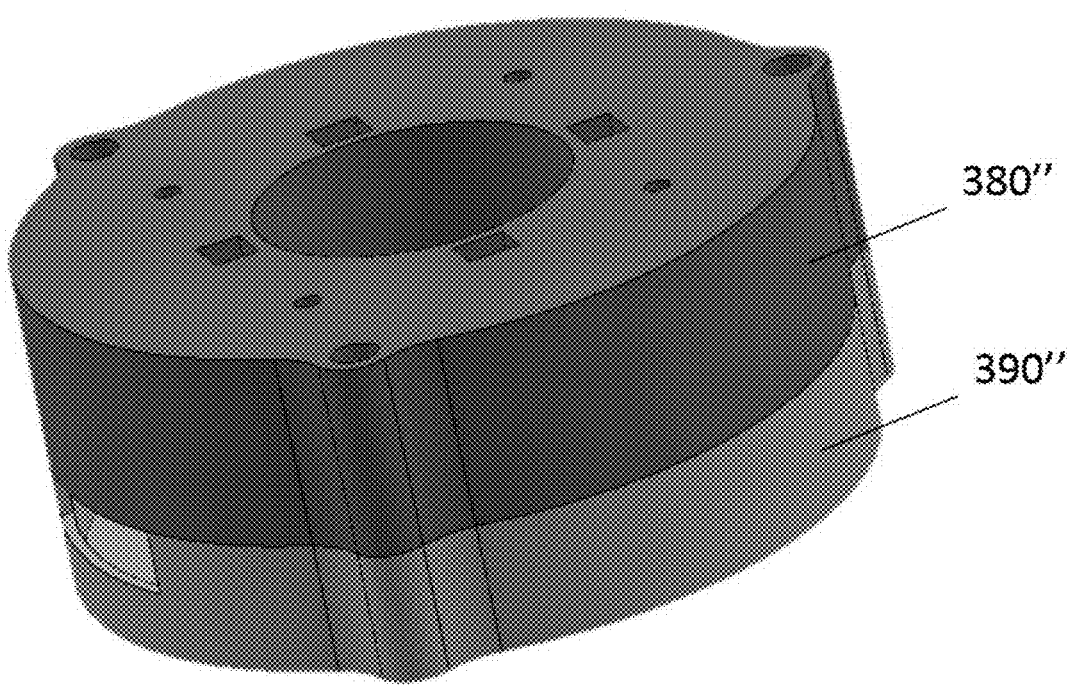
FIG. 11 is a perspective isolated view of a bottom outer end cap and electronics endcap of the input apparatus of FIGS. 8A-B.
Figure 12:
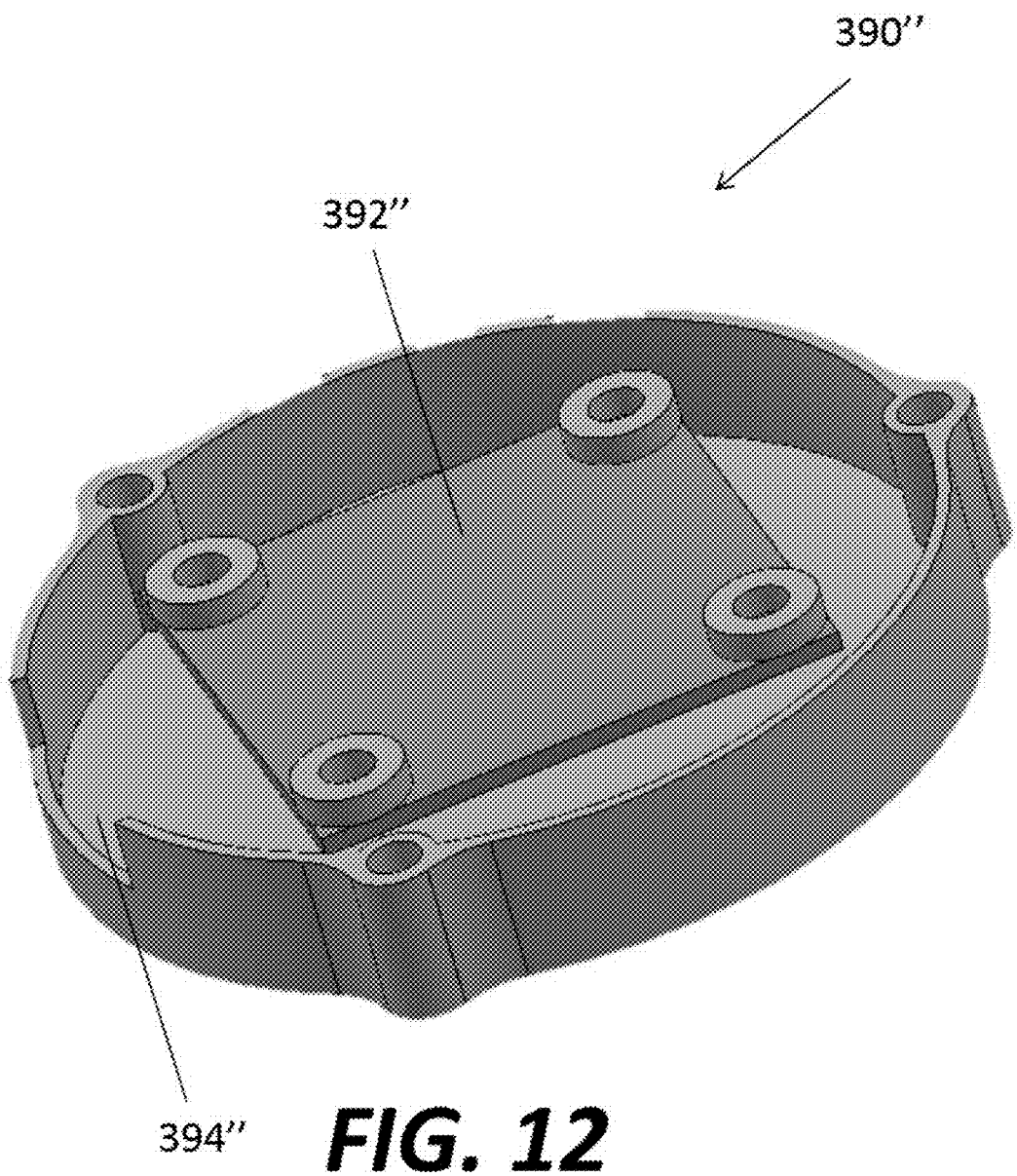
FIG. 12 is a perspective isolated view of the electronics endcap of FIG. 11.

The components of sensing and hinge mechanism 300" between the top outer end cap 310" and bottom outer end cap 380" may be identical to the corresponding components of sensing and hinge mechanism 300. A electronics end cap 390" may be positioned below and coupled to bottom outer end cap 380". As shown in FIG. 11, bottom outer end cap 380" may include a plurality of recesses to house one or more sensors, such as the Hall effect sensors described above in connection with bottom outer end cap 380". In addition, bottom outer end cap 380" may include a plurality of through holes that extend through the bottom of bottom outer end cap 380", for example to allow wires or other components to pass through into electronics end cap 390". It should be understood that an electronics end cap may be provided with joystick 10 for similar reasons it is provided in joystick 10". As shown in FIG. 12, electronics end cap 390" may be define a space to receive electronics, such as circuit board 392", to help process signals received from any sensors or other electronic components in joystick 10". Electronics end cap 390" may also include a slot 394" to allow for wires or other items to pass into electronics end cap 390", for example wires connecting to the battery within battery enclosure 815 (or to any other desired device) to provide electronic coupling with electronic end cap 390".

Although the invention herein has been described with reference to particular embodiments, it is to be understood that these embodiments are merely illustrative of the principles and applications of the present invention. For example, although a single joystick system is described, two joysticks corresponding to right- and left-handed versions may be used in a single system to provide for additional control of a device. In addition, although control of six degrees of motion is described generally, any combination of desired degrees of motion, including any combination of movements resulting in one, two, three, four, five, or six degrees of motion, may be controlled by the devices described herein. It is therefore to be understood that numerous modifications may be made to the illustrative embodiments and that other arrangements may be devised without departing from the spirit and scope of the present invention as defined by the appended claims.

The invention claimed is:

1. A joystick input apparatus comprising:
    a handgrip portion;
    a rigid connector portion having a first end mounted to the handgrip portion and being opposite a second end; and
    a hinge mechanism including:
        a first living hinge having a first outer rim portion coupled to a first inner disc portion by a first plurality of arced beams having a spiral configuration, the rigid connector portion extending through a center of the first inner disc portion so that movement of the rigid connector portion is fully transmitted to the first living hinge;
        a second living hinge having a second outer rim portion coupled to a second inner disc portion by a second plurality of arced beams having a spiral configuration, the rigid connector portion extending through a center of the second inner disc portion so that movement of the rigid connector portion is fully transmitted to the second living hinge, the first and second living hinges being spaced apart from one another; and
        a third living hinge having a third outer rim portion coupled to a third inner disc portion by a third plurality of arced beams having a spiral configuration, a rotatable member being rotatably coupled to a center of the third inner disc portion, the rigid connector portion extending through a center of the rotatable member so that rotation of the rigid connector portion about an axis extending through the center of the third inner disc portion is not transmitted to the third living hinge.

2. The joystick input apparatus of claim 1, further comprising a first inner spacer coupled to the rigid connector and spacing the first inner disc portion of the first living hinge a distance from the second inner disc portion of the second living hinge.

3. The joystick input apparatus of claim 2, further comprising a first outer spacer coupled to at least one of the first outer rim portion of the first living hinge or the second outer rim portion of the second living hinge and spacing the first outer rim portion of the first living hinge a distance from the second outer rim portion of the second living hinge.

4. The joystick input apparatus of claim 1, further comprising a top outer end cap defining a first terminal end of an outer portion of the hinge mechanism, the top outer end cap having an annular surface defining a cylindrical borehole extending through a center of the top outer end cap.

5. The joystick input apparatus of claim 4, further comprising a top inner end cap defining a terminal end of an inner portion of the hinge mechanism, the rigid connector portion extending through and coupled to a center of the top inner end cap.

6. The joystick input apparatus of claim 5, wherein the top inner end cap includes a first cylindrical portion positioned within the cylindrical borehole of the top outer end cap.

7. The joystick input apparatus of claim 6, wherein the top inner end cap includes a second flange portion having a diameter greater than a diameter of the cylindrical borehole of the top outer end cap.

8. The joystick input apparatus of claim 4, further comprising a bottom outer end cap defining a second terminal end of the hinge mechanism and having an annular extension extending toward the top outer end cap, the annular extension defining an inner circular rim within the hinge mechanism.

9. The joystick input apparatus of claim 8, further comprising a bottom inner end cap coupled to a terminal end of the rigid connector portion and having a substantially cylindrical outer surface, the bottom inner end cap being positioned at least partially within the inner circular rim of the bottom outer end cap.

10. The joystick input apparatus of claim 9, wherein the first living hinge is positioned closer to the top outer end cap than the second living hinge, and the third living hinge is positioned closer to the bottom outer end cap than the second living hinge.

11. The joystick input apparatus of claim 1, wherein the rotatable member of the third living hinge includes at least one magnet configured to rotate with the rotatable member.

12. The joystick input apparatus of claim 11, wherein the third living hinge includes a Hall effect sensor, the magnet of the rotatable member configured to rotate with respect to the Hall effect sensor.

13. The joystick input apparatus of claim 1, wherein the rigid connector portion includes a first end positioned within the handgrip portion and a second end opposite the first end and positioned within the hinge mechanism, the first and second ends of the rigid connector portion extending along a longitudinal axis that also extends through a center of the hinge mechanism.

14. The joystick input apparatus of claim 1, wherein the rigid connector portion includes a first end positioned within the handgrip portion and having a first longitudinal axis extending therethrough, a second end opposite the first end and positioned within the hinge mechanism and having a second longitudinal axis extending therethrough, and a third middle portion connecting the first end to the second end, the first longitudinal axis being angled with respect to the second longitudinal axis between about 10 degrees and about 30 degrees.

15. They joystick input apparatus of claim 14, wherein the angle is about 20 degrees.

16. The joystick input apparatus of claim 1, wherein the first living hinge is rotationally offset with respect to the second living hinge in the absence of applied force.

17. The joystick input apparatus of claim 16, wherein the rotational offset between the first and second living hinges is about three degrees.

18. The joystick input apparatus of claim 1, wherein movement of the hinge mechanism provides for tracking of between one and six degrees of motion.

19. The joystick input apparatus of claim 18, wherein movement of the hinge mechanism provides for tracking of three degrees of motion.

20. The joystick input apparatus of claim 18, wherein movement of the first and second living hinges provides for tracking of five degrees of motion, and movement of the third living hinge provides for tracking of one degree of motion.

* * * * *